(12) United States Patent
Elsheemy

(10) Patent No.: US 10,217,357 B1
(45) Date of Patent: Feb. 26, 2019

(54) AUTONOMOUS IN-VEHICLE VIRTUAL TRAFFIC LIGHT SYSTEM

(71) Applicant: Mohamed Roshdy Elsheemy, Akron, OH (US)

(72) Inventor: Mohamed Roshdy Elsheemy, Akron, OH (US)

( * ) Notice: Subject to any disclaimer, the term of this patent is extended or adjusted under 35 U.S.C. 154(b) by 0 days.

(21) Appl. No.: 15/803,414

(22) Filed: Nov. 3, 2017

(51) Int. Cl.
| | | |
|---|---|---|
| *G08G 1/0967* | (2006.01) | |
| *G08G 1/096* | (2006.01) | |
| *G08G 1/01* | (2006.01) | |
| *B60Q 9/00* | (2006.01) | |

(52) U.S. Cl.
CPC ............. *G08G 1/0967* (2013.01); *B60Q 9/00* (2013.01); *G08G 1/0112* (2013.01); *G08G 1/0133* (2013.01); *G08G 1/096* (2013.01)

(58) Field of Classification Search
CPC .. G08G 1/0967; G08G 1/0112; G08G 1/0133; G08G 1/096; B60Q 9/00
See application file for complete search history.

(56) References Cited

U.S. PATENT DOCUMENTS

2013/0116915 A1\* 5/2013 Ferreira ................. G08G 1/163
701/117

\* cited by examiner

*Primary Examiner* — Leon Flores

(57) ABSTRACT

An autonomous in-vehicle virtual traffic light system that mimics conventional traffic signal systems and neither depends on vehicle to vehicle communication nor vehicle to intersection or road sensors communication nor vehicle to wireless network communication. The system does not depend on external servers nor broadcast stations to forward traffic information to conventional vehicles or driverless vehicles. A virtual traffic controller placed on-board vehicles to provide traffic information including traffic light signals and images of road signs autonomously.

24 Claims, 13 Drawing Sheets

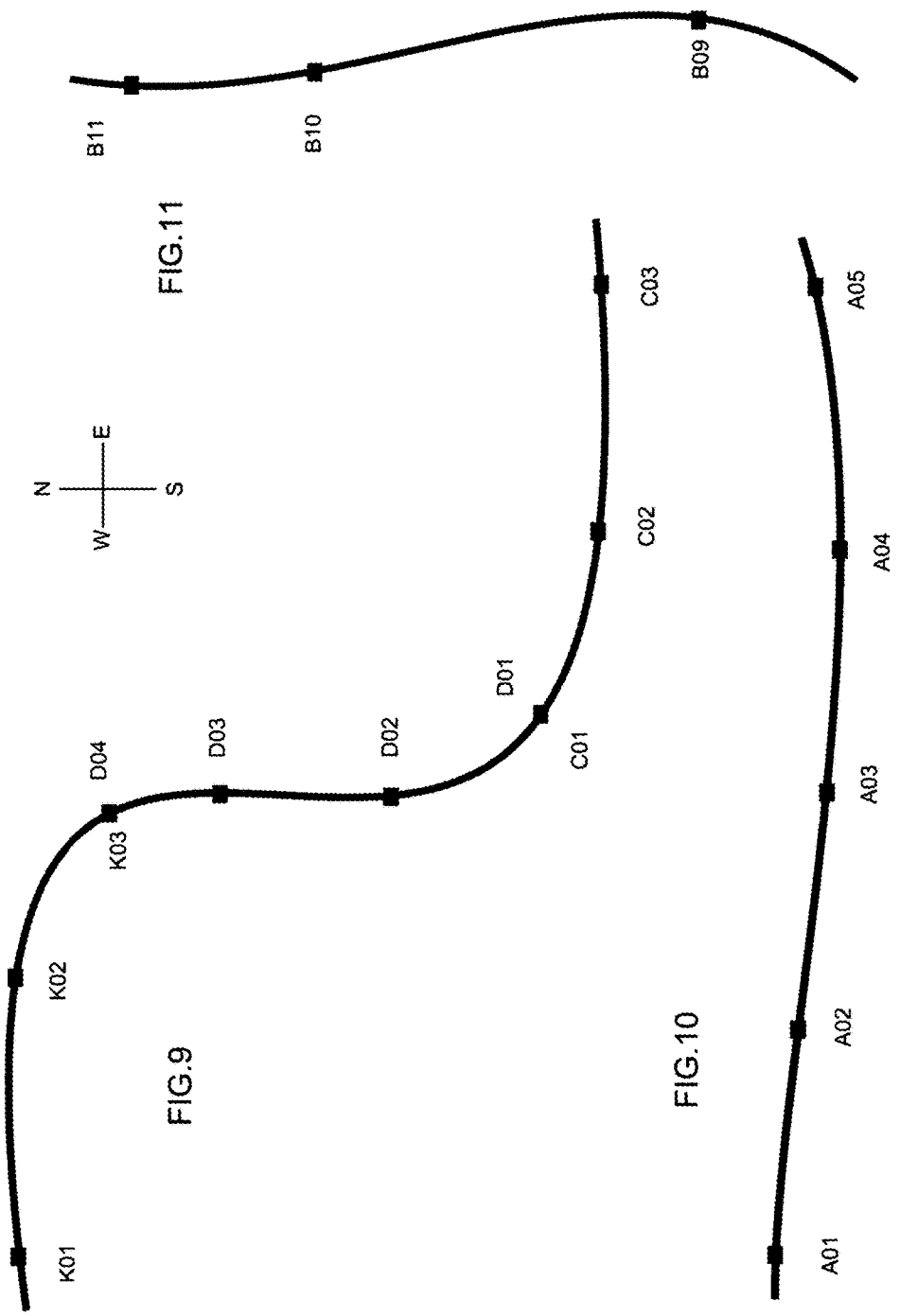

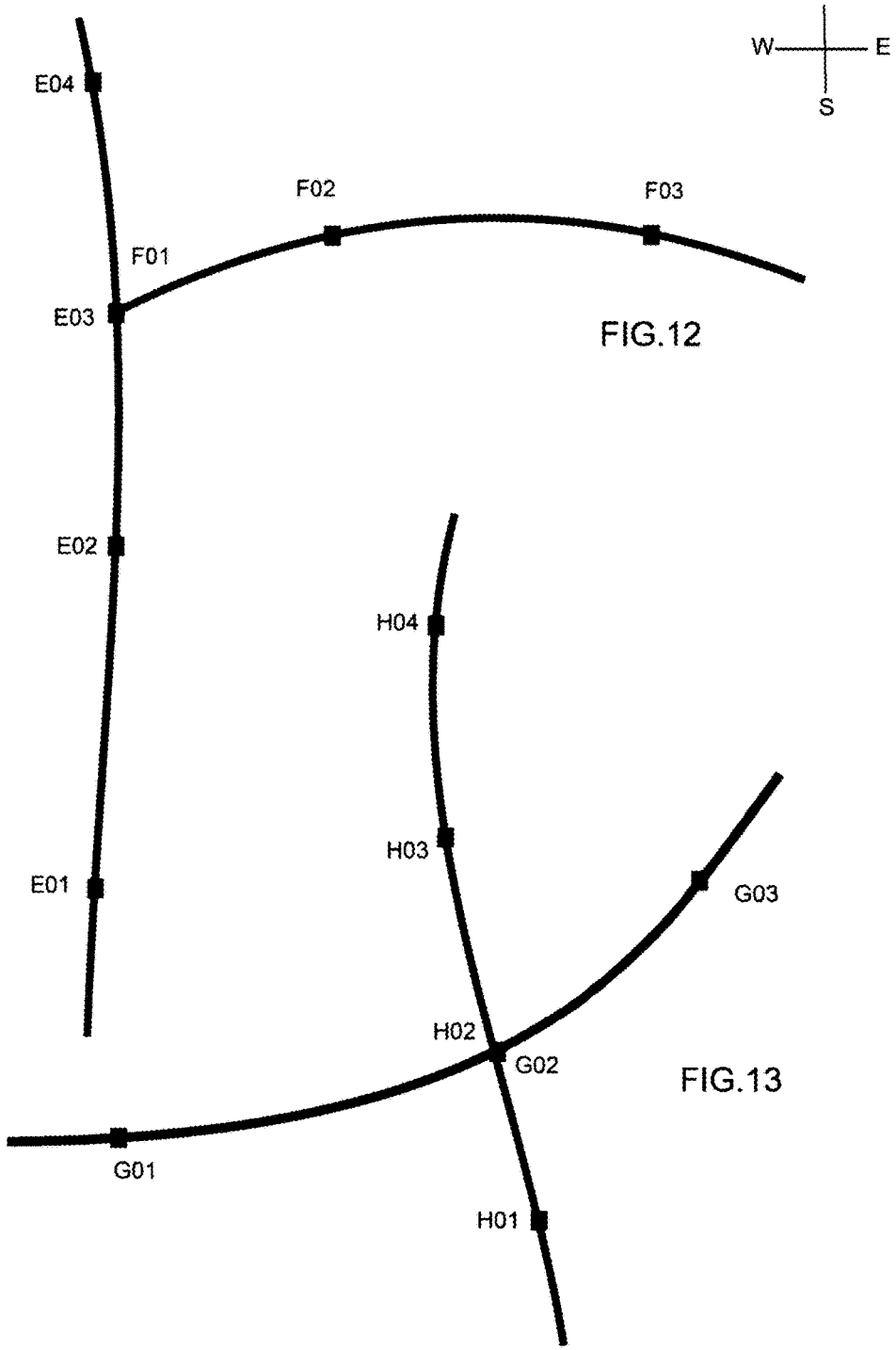

Table Section_Location

| LatA | LonA | Location_ID |
|---|---|---|
| 41.6 | -81.2 | 44114 |
| 41.5 | -81.2 | 44114 |
| 41.5 | -81.3 | 44114 |
| ....... | ....... | ........... |
| 41.5 | -82.1 | 44114 |
| 41.4 | -81.2 | 44114 |
| ....... | ....... | ........... |
| 41.4 | -82.1 | 44114 |
| 41.3 | -81.2 | 44114 |
| ...... | ....... | ........... |
| 41.3 | -82.1 | 44114 |
| 41.2 | -81.2 | 44308 |
| ....... | ....... | ........... |
| ....... | ....... | ........... |
| 41.0 | -81.5 | 44308 |
| ....... | ....... | ........... |
| ....... | ....... | ........... |
| 40.9 | -81.7 | 44308 |
| ....... | ...... | ...... |

FIG.14

Table 44308 Segment ID

| Latitude | Longitude | Segment ID |
|---|---|---|
| 41.04664 | -81.52749 |  |
|  |  | 2WIL1314 |
| 41.04672 | -81.51019 |  |
|  |  | 1BRO2021 |
| 41.03985 | -81.50741 |  |
|  |  | 1BRO2021 |
| 41.02883 | -81.51048 |  |
|  |  | 2WAT1718 |
| 41.02867 | -81.52698 |  |
|  |  | 1HIG1011 |
| 41.03609 | -81.52990 |  |
|  |  | 1HIG1011 |
| 41.04001 | -81.52695 |  |
|  |  | 1HIG1011 |
| 41.04664 | -81.52749 |  |
|  |  |  |

FIG.15

Table Cases ID

| H.int ID | V.int ID | Latitude | Longitude | Cases | Delay |
|---|---|---|---|---|---|
| WIL13 | HIG11 | 41.04664 | -81.52749 | 101002 | 20 |
| WIL14 | BRO21 | 41.04672 | -81.51019 | 203010 | 35 |
| WAT18 | BRO20 | 41.02883 | -81.51048 | 404010 | 35 |
| WAT17 | HIG10 | 41.02867 | -81.52698 | 205010 | 50 |
| | | | | | |
| | | | | | |

FIG.16

Table Cases_ Timing for Model (3,4,5,6)

| Case_ID | Timing |
|---|---|
| 30 | 90802020 |
| 31 | 80602000 |
| ... | ... |
| 40 | 60601515 |
| 41 | 60600015 |
| ... | ... |
| 50 | 99602515 |
| 51 | 60601515 |
| ... | ... |
| 60 | 60801525 |
| 61 | 80602020 |
| ... | ... |

FIG.17

Table Cases ID for M.L int(6 Legs)

| M.L int ID | Latitude | Longitude | Order | Cases | Delay |
|---|---|---|---|---|---|
| BRI19 | 41.08472 | -81.46702 | 1 | 707172 | 40 |
| LAN15 | 41.08472 | -81.46702 | 2 | 707172 | 40 |
| WOD22 | 41.08472 | -81.46702 | 3 | 707172 | 40 |
| BRI19 | 41.08472 | -81.46702 | 4 | 707172 | 40 |
| LAN15 | 41.08472 | -81.46702 | 5 | 707172 | 40 |
| WOD22 | 41.08472 | -81.46702 | 6 | 707172 | 40 |
|  |  |  |  |  |  |
|  |  |  |  |  |  |
|  |  |  |  |  |  |
|  |  |  |  |  |  |

FIG.18

Table Cases_ Timing for Model 7

| Case_ID | Timing |
|---|---|
| 70 | 605045202020 |
| 71 | 404030200015 |
| 72 | 302525101000 |
|  |  |

FIG.19

Table 44308 Sign ID

| | Latitude | Longitude | Sign ID |
|---|---|---|---|
| 80 | 41.04664 | -81.52749 | |
| | | | 210111213 |
| 82 | 41.04672 | -81.51019 | |
| | | | 114151617 |
| 84 | 41.03985 | -81.50741 | |
| | | | 118191819 |
| 86 | 41.02883 | -81.51048 | |
| | | | 220212021 |
| 88 | 41.02867 | -81.52698 | |
| | | | 122232425 |
| 90 | 41.03609 | -81.52990 | |
| | | | 122232425 |
| 92 | 41.04001 | -81.52695 | |
| | | | 122232425 |
| 94 | 41.04664 | -81.52749 | |
| | | | |

AUTONOMOUS IN-VEHICLE VIRTUAL TRAFFIC LIGHT SYSTEM

CROSS-REFERENCE TO RELATED APPLICATION(S)

The present application claims priority to U.S. application Ser. No. 14/999,005 filed on Mar. 16, 2016, entitled "Running Red Lights Avoidance and Virtual Preemption System", the entire disclosure of which is incorporated by reference herein. Additionally, this application claims priority to U.S. application Ser. No. 14/544,801 filed on Feb. 20, 2015, entitled "Comprehensive Traffic Control System", referred herein as Elsheemy, [Also U.S. Provisional Application No. 62/285,455], the entire disclosure of which is incorporated by reference herein.

FIELD OF THE INVENTION

The present invention relates generally to traffic control systems and more particularly to autonomous in-vehicle traffic light systems and autonomous in-vehicle road signs systems.

BACKGROUND OF THE INVENTION

The rapid growth in developing countries has caused a problem with the demand of electricity. Rolling blackouts have been occurring on a regular basis. Also in most countries including developed countries, hurricanes and severe storms can knockout power-lines and cause blackout. Traffic light relies on electricity to illuminate its lamps or its displays to control the traffic in busy roads. Generally when a traffic light is non-operational, all drivers are required to stop at the intersection, take turns as if it were a four-way stop and proceed through with caution, but that does not always happen and car accidents are sadly a frequent result. Additionally, heavy fogs, snow storms and sandstorms may cause the drivers to lose the line-of-sight with traffic lights or road signs. Additionally, intersection and road way crashes cost U.S alone tens of US $ billion annually.

Costs of Conventional Traffic Systems

The National Traffic Signal Report Card: Technical Report

Developed by the National Transportation Operations Coalition (NTOC) used three key components to estimate the costs of traffic signal operations:
1. Appropriate traffic signal hardware
2. Routine traffic signal timing updates; and
3. Maintenance performed by well-trained technicians Traffic signal hardware consists of several primary components: the signal heads, sensors to detect vehicular traffic, and the signal controller. Having up-to-date equipment is important to sound traffic signal operations. The signal controller should be upgraded, at a cost of approximately $10,000 each, at a minimum of every 10 years.

Routine traffic signal timing updates cost $3,000 or less per intersection. Signal timing plans should be updated every three to five years, or more frequently depending on growth and changes in traffic patterns.

Well-trained technicians are needed to maintain traffic signal hardware so that the signal system is operating in good order and according to the timing updates. A current assumption is one traffic signal technician can maintain 30-40 signals. The average costs of a technician is $56,000 per year which includes salary, benefits (approximately 30-35% of salary), vehicles, parts/supplies, and other required items.

Given the cost data above and assuming that the U.S. has 265,000 signals, the annual costs associated with signal timing can be calculated as following.
Hardware:
Each year $1/10$ of the controllers are replaced
265,000/10=26,500 controllers per year
Total cost is $256 million per year Timing Updates:
Signal retiming interval is every four years
265,000/4=66,250
$3,000 per signal
Total cost is roughly $200 million per year Maintenance:
One technician maintains 30 signals
265,000/30=8,822 technicians
$56,000 per technician
Total cost is roughly $500 million per year
Grand total cost for signal timing per year across the U.S. is $965 million.

According to the Arizona Department of Transportation, a modern traffic signal can cost $80,000 to $100,000 to install, depending on the complexity of the location and the characteristics of the traffic in the area.

According to the City of Woodbury, Minn. website, a complete traffic signal for a standard four-way intersection will cost around $250,000 to $300,000. Other expenses like project inspection and design can bring up the cost to almost $300,000.

Implementation Costs for Automated Red Light Camera

A red light camera (short for red light running camera) is a type of traffic enforcement camera that captures an image of a vehicle which has entered an intersection in spite of the traffic signal indicating red (during the red phase). By automatically photographing vehicles that run red lights, the photo is evidence that assists authorities in their enforcement of traffic laws. Generally the camera is triggered when a vehicle enters the intersection (passes the stop-bar) after the traffic signal has turned red. Typically, a law enforcement official will review the photographic evidence and determine whether a violation occurred. A citation is then usually mailed to the owner of the vehicle found to be in violation of the law.

Automated red light camera systems range from $67,000 to $80,000 per intersection.

Automated red light camera systems consist of fixed costs (the costs of the equipment and installation) and variable costs (the cost associated with the back office ticket processes). Overall, the cost for implementing an automated red light enforcement system depends on the geometry of the intersection, and the number lanes/approaches monitored. System costs include the cost of the camera (approximately $50,000), in-pavement inductive loop detectors ($5K per leg), and costs associated with camera housings, poles, flash slaves, and wiring ($5,000 to $8,000). The City of San Francisco, Calif. spent $80,000 per intersection which included installation of loops, wires, poles, and cameras, and the City of Jackson, Mich. spent $67,000 (1998 prices) per intersection for a system that included one wet film camera, housing, loop, pole, and installation. The variable costs are unique to each jurisdiction's ticketing process and procedures, as well as agreement between the jurisdiction and contractor processing the violations.

Traffic signal preemption (also called traffic signal prioritization) is a type of system that allows the normal operation of traffic light to be preempted. The most common use of these systems is to manipulate traffic signals in the path of an emergency vehicle, halting conflicting traffic and allowing the emergency vehicle right-of-way, to help reduce response times and enhance traffic safety. Signal preemption can also be used by light-rail and bus rapid transit systems to allow public transportation priority access through intersections, or by railroad systems at crossings to prevent collisions.

Traffic preemption devices are implemented in a variety of ways. They can be installed on road vehicles, integrated with train transportation network management systems, or operated by remote control from a fixed location, such as a fire station, or by a 9-1-1 dispatcher at an emergency call center. Traffic lights must be equipped to receive an activation signal to be controlled by any system intended for use in that area. A traffic signal not equipped to receive a traffic preemption signal will not recognize an activation, and will continue to operate in its normal cycle.

Vehicular devices can be switched on or off as needed, but in the case of emergency vehicles they are frequently integrated with the vehicle's emergency warning lights. When activated, the traffic preemption device will cause properly equipped traffic lights in the path of the vehicle to cycle immediately, to grant right-of-way in the desired direction, after allowing for normal programmed time delays for signal changes and pedestrian crosswalks to clear.

Traffic signal preemption systems integrated with train transportation networks typically extend their control of traffic from the typical cross-arms and warning lights to one or more nearby traffic intersections, to prevent excessive road traffic from approaching the crossing, while also obtaining the right-of-way for road traffic that may be in the way to quickly clear the crossing.

Fixed-location systems can vary widely, but a typical implementation is for a single traffic signal in front of or near a fire station to stop traffic and allow emergency vehicles to exit the station unimpeded. Alternatively, an entire corridor of traffic signals along a street may be operated from a fixed location, such as to allow fire apparatus to quickly respond through a crowded downtown area, or to allow an ambulance faster access when transporting a critical patient to a hospital in an area with dense traffic.

Traffic signal preemption systems sometimes include a method for communicating to the operator of the vehicle that requested the preemption (as well as other drivers) that a traffic signal is under control of a preemption device, by means of a notifier. This device is almost always an additional light located near the traffic signals. It may be a single light bulb visible to all, which flashes or stays on, or there may be a light aimed towards each direction from which traffic approaches the intersection. In the case of multiple notifier lights at a controllable intersection, they will either flash or stay on depending on the local configuration, to communicate to all drivers from which direction a preempting signal is being received. This informs regular drivers which direction may need to be cleared, and informs activating vehicle drivers if they have control of the light (especially important when more than one activating vehicle approaches the same intersection). A typical installation would provide a flashing notifier to indicate that an activating vehicle is approaching from ahead or behind, while a solid notifier would indicate the emergency vehicle is approaching laterally. There are variations of notification methods in use, which may include one or more colored lights in varying configurations.

Emergency preemption equipment was deployed at several intersections in British Columbia, Canada at a cost of $4,000 (Canadian) per intersection according to U.S. Department of Transportation Intelligent Transportation Systems Joint Program Office.

Costs of Traffic Signs

Here are some approximate figures for sign installation costs, based on construction project bid prices in Arizona in the past few years. These prices will vary depending on quantity, location, type, etc.

On irregularly shaped signs such as Interstate markers, STOP & YIELD signs, NO PASSING ZONE pennants, sign area for payment is normally based on the largest width×the largest height.

All costs listed are for a complete sign assembly in place, including all legend, fabricating, transportation, labor, hardware, and painting of posts. Note that inflation and rapidly rising steel costs may make some of these figures quickly obsolete. Use with caution.

Sign panels:
    Regulatory/Warning/Marker: $15 to 18/sq.ft.
    Large Guide Signs: $20 to 25/sq.ft.
    Electronic Variable Message Sign: $50,000 to $150,000 each Sign Posts:
    U-Channel: $125 to $200 each
    Square Tube (Tele-spar): $10 to $15 per foot
    Large Steel Breakaway Posts: $15 to $30 per foot
    Cantilever Sign: $15,000 to $20,000 each
    Sign Bridge: $30,000 to $60,000 each Foundations:
    Square Tube: $150-$250 each
    Breakaway Post: $250 to $750 each
    Cantilever/Bridge: $6,000-$7,000 each It is important to further note that if one is evaluating the replacement cost of an existing sign, one must take into account the extra labor and transportation costs involved. This is why STOP signs are considered among the most expensive signs. Due to their critical importance in intersection safety, they must be replaced as soon as is reasonably feasible—even if that means driving 300+ miles round trip at 3 AM, at $1.00 per mile for the truck, and $25-$40 per hour overtime for each sign crew-person. Taking this into account, a simple $75 STOP sign suddenly becomes a $500+ item.

Engineering costs with respect to signing are more difficult to define. If a 3 month study results in installation of only 3 signs, it may not be equitable to charge the whole engineering cost to those installations. Normally, engineering costs are treated separately, but if there is a need to take them into account, then a rule of thumb estimate is engineering cost=10% to 15% of construction cost.

THE PURPOSE OF THE PRESENT INVENTION

The foregoing discussion has shed some light on extremely costly conventional intersection systems and the conventional road signs to provide safety for street traffic at intersections and on roads. Whereas the present invention can provide a highly efficient system for extremely low cost and extremely suitable for both developed and developing countries.

The need for a highly efficient and extremely low cost in-vehicle autonomous system that overcomes the foregoing problems is a noble goal. An autonomous system that do not rely on expensive infrastructure, an autonomous system that can replace the conventional or the highly costly traffic light systems without compromising the safety of the drivers or pedestrians, an autonomous system that can replace the actual road signs, an autonomous system that can fit all geographic rural and urban areas in rich and poor countries, an autonomous system that can fit any road or intersection shape. An autonomous system that do not depend on vehicle to vehicle communications nor vehicle to road detection sensors, which may cause accidents or jams wherein a very good chance of wrongly interpreting the sensors signals, an autonomous system that do not depend on vehicle to wireless communication network or intersection to vehicle communication, an autonomous system that can be extremely efficient in areas covered with or without cellular network service, an autonomous system that can be integrated with the automatic braking of the vehicle to prevent running red lights and to detect the primary signs of driving while impaired or driving while distracted, thus to reduce; accident rates, death rates, injuries rates and damage rates at intersections and along road ways. A system that can provide a highly efficient and extremely low cost preemption priority routes for emergency vehicles and also for civilian vehicles. A system that can be integrated with autonomous vehicles' computer systems to provide in-vehicle autonomous traffic light signals, in-vehicle autonomous road signs images and a virtual preemption system, in a programming code form directed to the autonomous vehicles computer systems.

Generally, autonomous vehicles rely on video cameras to detect traffic lights, read road signs and keep track of other vehicles, while also looking out for pedestrians and other obstacles.

The autonomous in-vehicle traffic light system and the autonomous road sign images integrate with the automatic braking of the vehicle along with virtual preemption system can make a unique system suitable for the autonomous vehicles to benefit from the present invention in many scenarios such as during blackouts or at dysfunctional conventional intersection or wherein no actual road signs or blocked road signs or wherein no cellular network signals in some areas.

And since the present system can replace the expensive conventional traffic systems, autonomous vehicles can rely completely on the systems of the present invention.

The ongoing field experiments and tests showed that the present system is outperforming the conventional intersection systems and actual road signs. Therefore the main objective of the present system is to terminate and replace the existing conventional systems. For example, a city like New may have its conventional systems replaced by the present system in a matter of a few weeks with enough data to cover road signs, traffic Cases for street intersections and emergency vehicle preemption system. The road signs of the present invention are a collection of the actual road signs images stored in a database.

But the line of sight and the clarity of images displayed on a screen facing the driver give the present system more advantage over the conventional systems especially in dark or crowded roads or during snow-storms, fog-storms, heavy rain, and sand-storms.

SUMMARY OF THE INVENTION

The vehicle unit and the visual display unit as being disclosed in U.S. application Ser. No. 14/544,801, (Elsheemy) in addition to as being disclosed in here is referred herein as V10 and is comprising flash memory and ROM as a component of the vehicle unit circuit board serve as a storage location for the unit, they store computer program code for programs of the present system and other systems of Elsheemy. They also store database comprising position coordinates of track points along center line of roads and at center points of intersections for determining geographic sections and leg segments of intersections, a plurality of predefined traffic Cases, threshold delay times, green and turning times for the predefined traffic Cases, and position coordinates of track points along center line of roads for determining road sign images, a predefined traffic Case basically is a double digit code to identify a traffic Case which holds the values of green and arrow turning times for just one segment per each road of an intersection, where a vehicle is traveling on a segment of a predefined intersection, the vehicle extracts a traffic Case from the database, the segment and the heading of the vehicle prompts a section of a programming code associated with a type of a traffic Case to display traffic signal phases autonomously. This section of the programming code belongs to just one segment of an intersection, while other sections belong to the other remaining segments and these sections are configured to coordinate the traffic signal phases for the whole intersection. The whole programming code for all legs of an intersection is called a Case Model.

The vehicle unit further comprises at least one GPS receiver module to enable the vehicle to determine its position coordinates, speed, course and date/time at real-time status.

The vehicle unit further comprises at least one processor being coupled to said database and said memory.

A visual display such as a touch screen or other types of displays coupled to said vehicle unit to display traffic signal phases associated with a predefined Case and to display road sign images associated with a road.

BRIEF DESCRIPTION OF THE DRAWINGS

FIG. 9 Illustrates an example of numbering the intersections on a horizontal street section coded C joins a vertical street section coded D joins a horizontal street section coded K.

FIG. 10 Illustrates an example of numbering the intersections on a horizontal street coded A.

FIG. 11 Illustrates an example of numbering the intersections on a vertical street coded B.

FIG. 12 Illustrates an example of numbering the intersections on a horizontal street coded F intersects with a vertical street coded E.

FIG. 13 Illustrates an example of numbering the intersections on a horizontal street coded G intersects with a vertical street coded H.

FIG. 14 Illustrates an example of SQL table Section_Location to locate a specific geographical section.

FIG. 15 Illustrates an example of SQL table to link between position coordinates on a leg-segment between two consecutive intersections on the same street and segment ID (segment identification).

FIG. 16 Illustrates an example of SQL table to link between intersection ID (intersection identification) for regular intersections (4-leg or 3-leg) and traffic Case IDs (Cases identification) and the intersection coordinates.

FIG. 17 Illustrates an example of SQL table to link the traffic Cases for regular intersections and their respective times.

FIG. 18 Illustrates an example of SQL table to link between intersection ID for Multi-leg (6-legs) intersection and the leg order and traffic Case IDs and the intersection coordinates.

FIG. 19 Illustrates an example of SQL table to link the traffic Cases for Multi-leg (6-legs) intersection and their respective times.

DETAILED DESCRIPTION OF PREFERRED EMBODIMENTS

In the most preferred embodiment of displaying the in-vehicle traffic light signals, the LCD screen displays the traffic signals in a form of geometric shapes such as squares or distinctive image icons, also the screen displays the road sign images such as speed limit, lane and intersection sign images and all other road sign images. The LCD also comprises a microphone, speaker, one or more cameras and a number of buttons for systems of Elsheemy. This unit may also comprise a bluetooth/WIFI module. In other embodiments of indicating the in-vehicle traffic light signals and the road sings, this indication could be via in-vehicle audible messages directed to the vehicle driver for cases such as motorcycles to enhance the safety of the driver while keeping his eyes on the road. Also, in other embodiments of indicating the in-vehicle traffic light signals, the road sings and the virtual preemption for both ordinary and emergency vehicles, this indication could be via in-vehicle computer codes directed to the vehicle computer system for cases such as autonomous vehicles "driverless cars".

The in-vehicle whole traffic light phases for all legs of an intersection are referred herein as a Case. The visual indication of an upcoming intersection programmed with a Case is shown as a geometric shape such as a big red or big yellow square or an image icon when the LCD screen is used to display the traffic light signals when the vehicle proximate to this intersection during yellow or red light phase, wherein the red light phase is shown as the big red square/icon, and the yellow light phase is shown as the big yellow square/icon, in addition to, an audible alert used for notification when the vehicle proximate to the intersection during yellow/red light phase, to increase the driver's awareness when his vehicle proximate to the intersection during yellow or red light phase.

The LCD unit may also comprise an LED intersection indicator to indicate the location of an intersection programmed with a traffic Case when the vehicle proximate to this intersection as previously mentioned.

In other embodiments the vehicle may include the LCD unit and/or a separate LED strip comprising LED indicators to indicate the in-vehicle traffic signals. The strip could be in a horizontal or a vertical orientation, and the LCD unit or the LED strip unit may comprise a bluetooth or WIFI module.

Furthermore, in other embodiments the vehicle unit may contain the LCD or the LED strip in the same housing.

The LCD or the LED strip along with the vehicle unit is referred herein as V10 unit.

Figure 1:
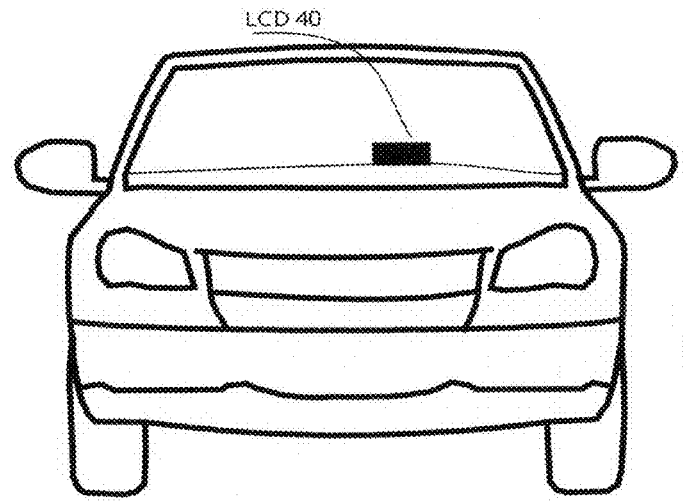
FIG. 1 Illustrates the location and the position of the vehicle LCD 40 unit inside the vehicle as a preferred embodiment of the present invention.
Figure 2:
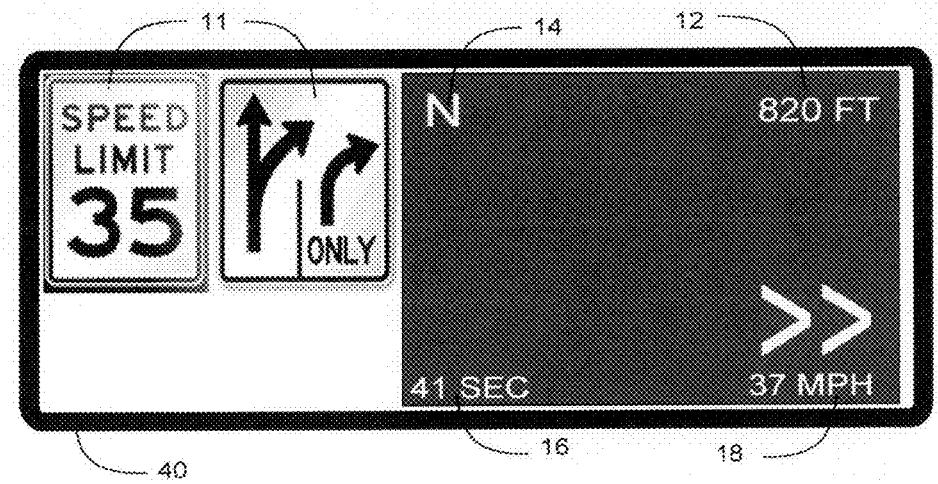
FIGS. 2-5 Illustrates examples of the vehicle LCD unit 40 (showing the traffic signal phases and images of road signs displayed on the LCD screen).
Figure 1A:
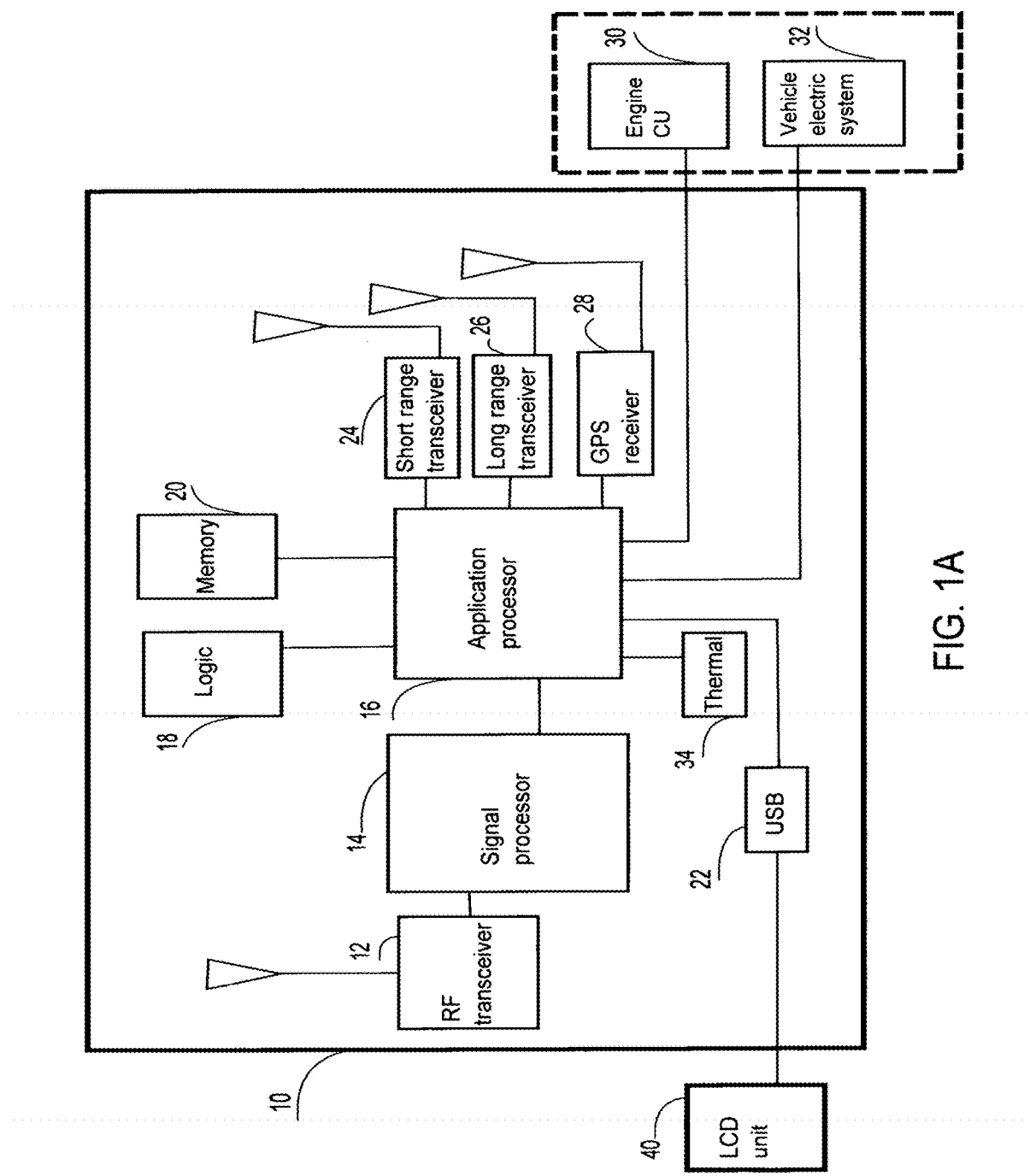
FIG. 1A Illustrates an example of the vehicle unit 10 connected to the vehicle LCD unit 40, also illustrates the vehicle unit 10 comprising the global positioning system (GPS) receiver module 28.
Figure 3:
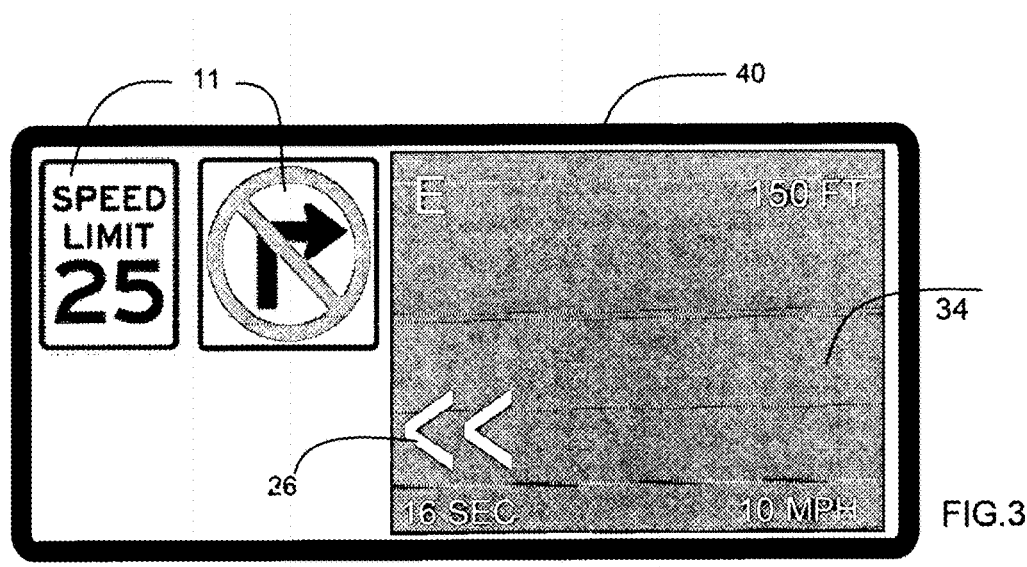
Figure 4:
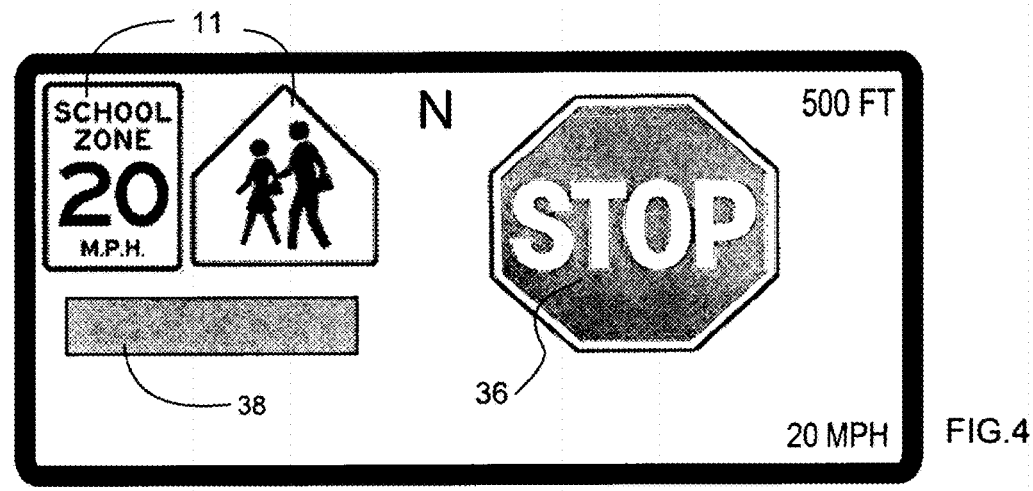
Figure 6:
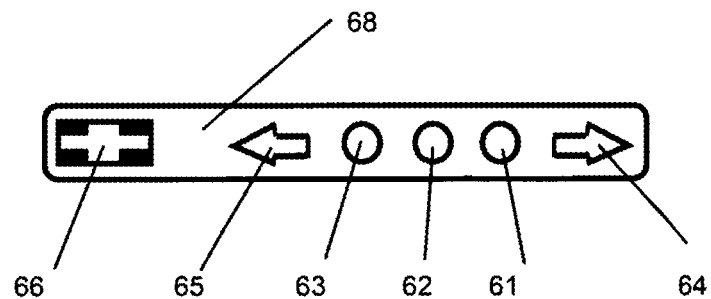
FIG. 6 Illustrates an example of a horizontal LED (light emitting diodes) strip.
Figure 7:
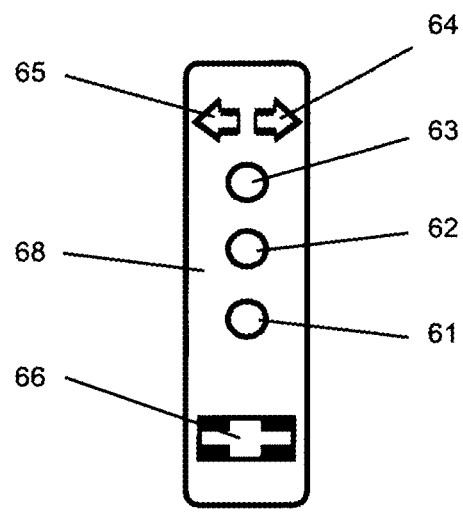
FIG. 7 Illustrates an example of a vertical LED (light emitting diodes) strip.
Figure 8:
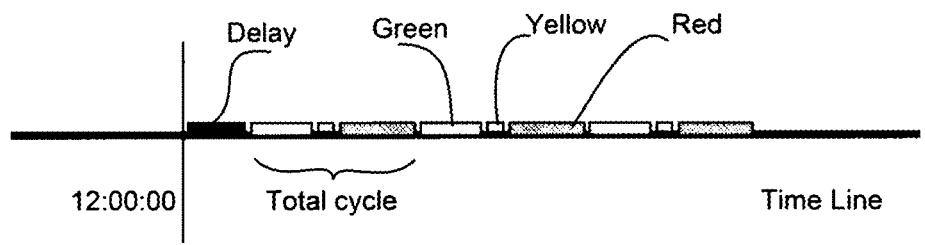
FIG. 8 Illustrates a timeline of a simple fixed traffic light cycle showing the threshold delay period before the beginning of the first cycle.

As shown in FIG. 1 the vehicle LCD unit 40 or the LED strip 68 in FIGS. 6 and 7 can be installed at any suitable location inside the vehicle to provide a comfortable line of sight with the driver, FIG. 1 is an example of the LCD 40 installed facing the driver without blocking his line of sight with the road, the LCD 40 or the LED strip 68 installed on top edge of the dash board as the most preferred location based on the field experiments.

As shown in FIGS. 2-5 the vehicle LCD unit 40 comprises a green light shape 20, yellow light shape 22, red light shape 24, big red light shape 34, big yellow light shape (not shown), green light shape for left turn arrow 26, yellow light shape for left turn arrow 27, green light shape for right turn arrow 30, yellow light shape for right turn arrow 32, stop sign image 36, yellow bar shape 38, road signs images 11, distance window 12 to show the distance between the vehicle and the upcoming intersection, course window 14 to show the heading of the traveling vehicle, remaining time window 16 to show the remaining time in seconds for the current signal phase and speed window 18 to show the speed of the vehicle.

As shown in FIGS. 6 and 7, the LED strip 68 comprises a green LED indicator 61, a yellow LED indicator 62, a red LED indicator 63, a green right arrow LED indicator 64, and a green left arrow LED indicator 65, the LED indicators illuminate the respective autonomous in-vehicle traffic light phases, also the intersection indicator 66 to illuminate only during red or yellow light phase when the vehicle is less than 350 meters away from the intersection.

The autonomous in-vehicle traffic light system is an in-vehicle virtual system that mimics the conventional street traffic signals. The system relies on a database of Latitude/Longitude of track points along the center line of roads and at the center of intersections, and a very small database of predefined Cases that fit all possible variation of traffic from the busiest traffic to the lowest traffic at street intersections during the different hours of the day, the Case stored inside the database as a couple digits for identification and few digits holds the values of green and turning arrow times relevant to just two leg segments of a two-road intersection, or holds the values of green and turning arrow times relevant to just three leg segments of a three-road intersection, to be used inside a Case Model's programming code associated with an intersection. A Case Model's programming code is referred herein as an in-vehicle virtual traffic controller, and is disclosed with great details in the following paragraphs.

The autonomous in-vehicle traffic light system neither depends on vehicle to vehicle communication nor intersection to vehicle communication nor vehicle to network communication, with extremely high efficiency that mimics and outperforms the actual street traffic signals and the conventional intersection traffic controllers.

A typical two-road intersection generally has four legs, each intersection leg is represented by a leg segment. Traffic lights are used to control safety and regulate traffic at intersections, by alternating the right of way accorded to the traveling vehicles.

Figure 20:
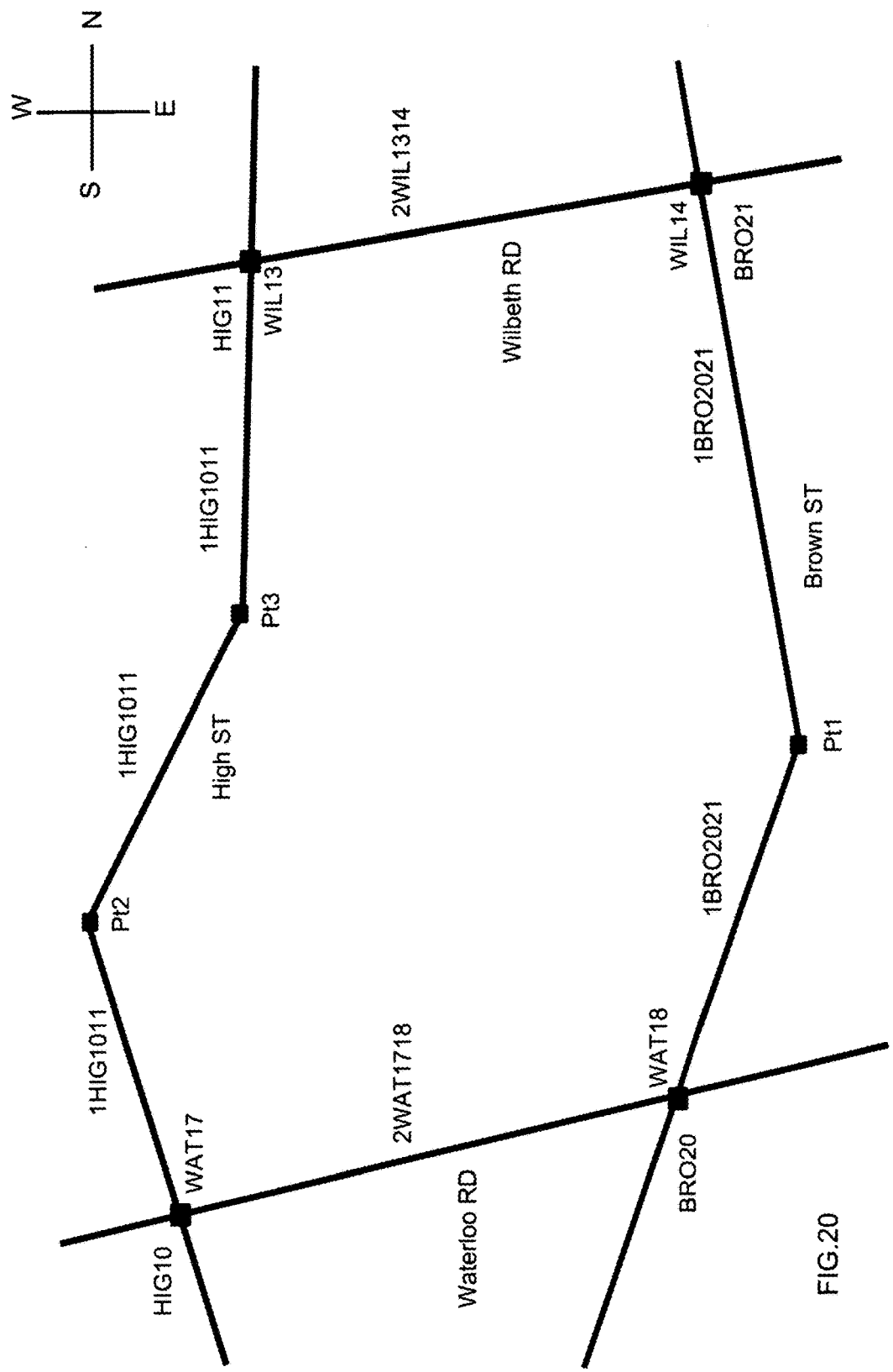
FIG. 20 Illustrates an example of the drop points at the center of the intersections and few drop points to represent the curvature of the segments between intersections.
Figures 22, 23:
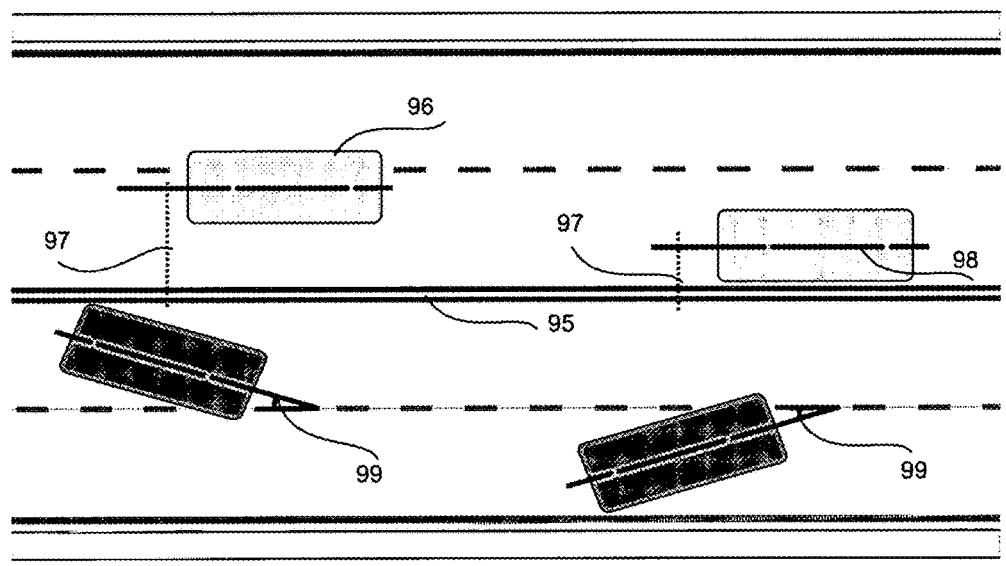
FIG. 22 Illustrates an example of SQL table to link between position coordinates of a vehicle on a road segment between two track points on the same street and a road sign image ID.
FIG. 23 Illustrates an example of a vehicle's behavior on a road segment between two track points on the same road.
Figure 24:
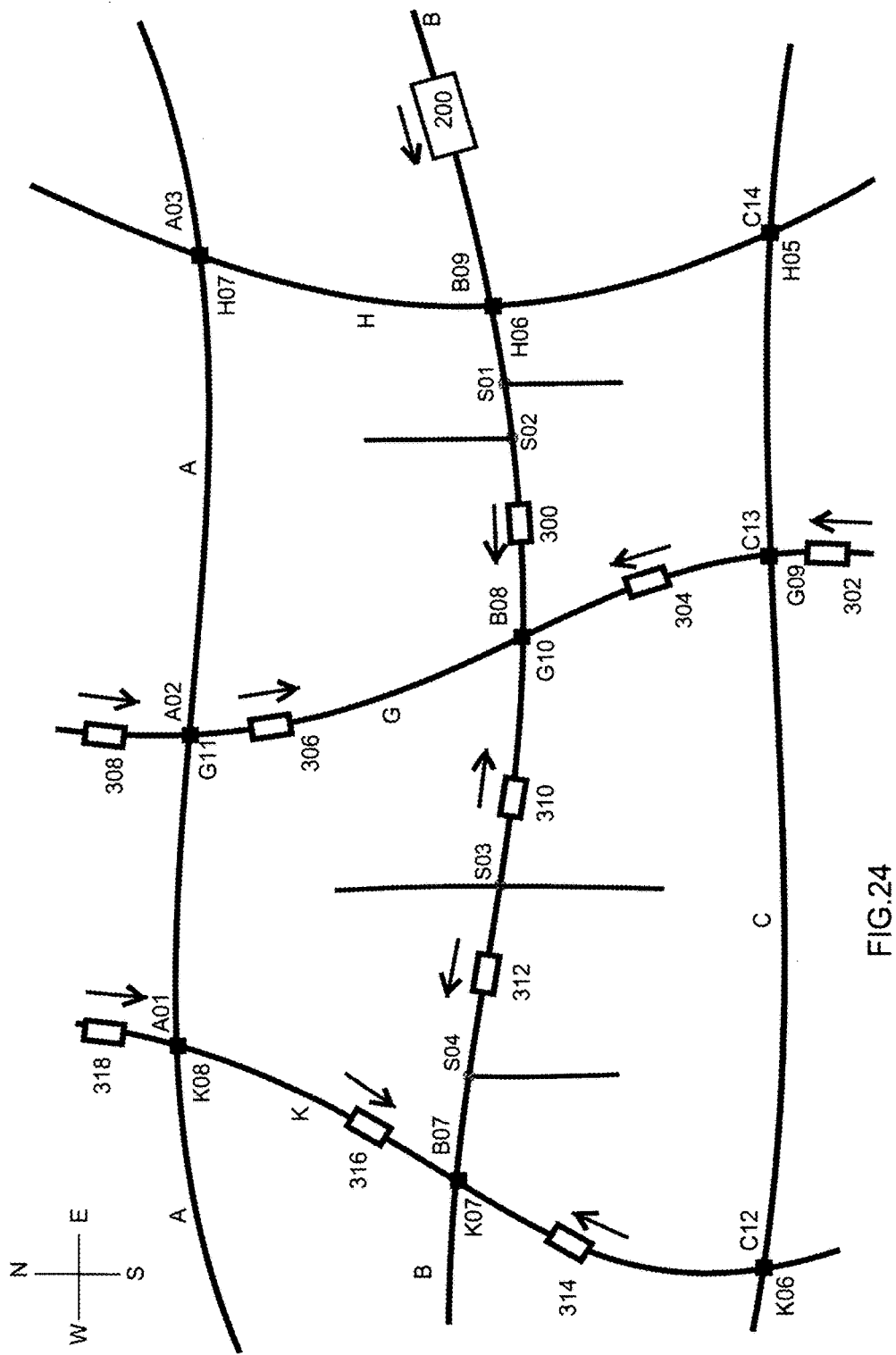
FIG. 24 Illustrates an example of the virtual preemption system of the present invention.

Laying street center-line track points to create street intersections leg-segments as shown in FIGS. 15, 20 and 23. Database of Latitude/Longitude of track points create a virtual trail for each leg-segment. The track points could be dropped as the center points of the intersections when the center lines of the segments between the intersections are straight lines.

When the center lines of the segments are curvy, a few extra points are dropped to represent the curvature of the segment. Triangulation uses the intersections' coordinates or the coordinates of two track points between them the vehicle is traveling and the vehicle's coordinates to verify the position of the vehicle inside a segment, as shown in FIG. 23 when a perpendicular distance 97 from the vehicle's location to the center line 95 of the segment exceeds half of the Calculation segment's width "a selected value", it means that the vehicle 96 is outside the segment. By using triangulation, we can reduce the amount of track points required to describe a segment since we convert the center line of the segment into a series of straight lines.

The vehicle's course along with the slope angle of the line 95 between the two track points can determine the deviation angle 99 between the vehicle's longitudinal axis 98 and the center line 95.

The vehicle unit V10 can be loaded with database of track points, a small database of predefined Cases and a small database of images of actual road signs, enough to cover an entire country, state or quite few countries of interest. Also the owners of the vehicles may obtain the database in CD-ROM format and load them onto the V10 unit or they may use microSD memory cards that are preloaded with the database that can easily be added, or obtain the database by other means.

The green light allows traffic to proceed, the yellow light indicates prepare to stop short of the intersection, and the red light prohibits any traffic from proceeding.

Flashing red should be treated as a stop sign and also can signal the road is closed. Flashing yellow should be treated as caution, crossing or road hazard ahead. Flashing green will vary among jurisdiction; it can give permission to go straight as well as make a left turn in front of opposing traffic "which is held by a steady red light", can indicate the end of a green cycle before the light changes to a solid yellow, or "as in some countries indicates the intersection is a pedestrian crosswalk".

Traffic signal timing is used to determine which approach has the right-of-way at an intersection, and how much green time the traffic light shall provide at an intersection approach, how long the yellow interval, how long the red light and how long green turning light, should be, and how long the pedestrian "walk" signal should be.

The GPS receiver module 28 "or any other in-vehicle positioning receivers" in the vehicle unit V10 enables the vehicle unit to determine its coordinates, speed, heading and date/time at real-time status, by matching and comparing the GPS coordinates of the vehicle to the Latitude/Longitude data of track points in the database, the unit V10 can determine the exact leg segment. As shown in FIG. 20, the segment could be a section of a road between two consecutive road intersections, or it could be an intersection leg of a length lies between 0.1 mile and 0.5 mile depending on the speed limit of the road. Generally, each leg segment is identified by its road-name and a serial number or identified by a code. Occasionally, some cities may have similar road names; therefore the database uses special codes similar to the zip codes to identify different cities or geographic sections. The road names could be coded to eliminate any chance of having a repeated name for different roads inside the same geographic section.

The leg segment along with the vehicle's course and a segment orientation which is either vertical or horizontal triggers a respective part of a Case Model's programming code. And the vehicle's LCD displays the signal shapes "squares or image icons for example". As shown in FIGS. 2-5.

The big red 34 or big yellow light shape (not shown) only appears on the screen when the vehicle is less than 350 meters away from a predefined intersection to indicate the location of this intersection during a yellow or red signal phase, the big red represents the red light signal when the vehicle is less than 350 meters away from the intersection, the big yellow represents the yellow light signal when the vehicle is less than 350 meters away from the intersection, and when the vehicle is less than 200 meters away from the intersection during a yellow or red signal phase, an audio alert starts beeping to indicate the location of this intersection. Also, distinctive colored marks painted on the pavement of the intersection or a distinctive actual road sign at the intersection can indicate a predefined intersection to enhance the awareness of drivers approaching this intersections, the 350 and 200 meters were confirmed by the field experiments.

Conventional Use of Traffic Volume

Traffic volume is an important basis for determining what improvements, if any, are required on a highway or street facility. Traffic volumes may be expressed in terms of average daily traffic or design hourly volumes. These volumes may be used to calculate the service flow rate, which is typically used for evaluations of geometric design alternatives.

The Federal Highway Administration's (FHWA's), Office of Highway Policy Information has traditionally maintained national programs to track traffic trends.

Traffic Volume Trends is a monthly report based on hourly traffic count data reported by the States. These data are collected at approximately 4,000 continuous traffic counting locations nationwide and are used to estimate the percent change in traffic for the current month compared with the same month in the previous year. Estimates are re-adjusted annually to match the vehicle miles of travel from the Highway Performance Monitoring System and are continually updated with additional data.

The Process of Building the In-Vehicle Database of the Present Invention

The present invention uses the traffic volume data which are collected via different means of counting traffic volume in each direction of the road and convert them into volume size code, for instance, H represents high volume, M represents medium volume, L represents low volume, and XL represents extremely low volume, B represents both directions, N represents northbound direction, S represents southbound direction, E represents eastbound direction and W represents westbound direction.

For instance, The code 1HS will refer to a vertical road section with high traffic volume southbound and lesser traffic volume northbound, also, the code 1HN will refer to a vertical road section with high traffic volume northbound and lesser traffic volume southbound. Similarly, the code 2ME will refer to a horizontal road section with medium traffic volume eastbound and lesser traffic volume westbound, the code 2LB will refer to a horizontal road section with low traffic volume in both directions.

The present invention uses a database processing software (the processing software is not installed in vehicles, it is only used for building the database which will be in-vehicle database), this software is being coupled to a GPS digital map (a processing map) to generate the center points coordinates of the intersections and the track points coordinates and to assign a predefined Case to each predefined intersection on the processing map based on the traffic volume size code of each leg of the intersection, in this map roads are coded by the volume size codes to indicate the size of traffic in each leg segment of intersections. Moreover, any road in this map is coded by different volume size codes for busy traffic hours period, medium traffic hours period and low traffic hours period to represent the change of traffic volumes during the hours of the day to mimic the actual traffic light performance.

Note: predefined intersections refer to road intersections equipped with traffic signals and other equipment or the intended signaled intersections, "the main objective of the present invention is to replace the equipment at these intersections by the autonomous in-vehicle virtual traffic light system".

SQL (Structured Query Language) as an example of a database is a computer language aimed to store, manipulate, and query data stored in relational databases. In a relational database, data is stored in tables. A table is made up of rows and columns. Each row represents one piece of data, and each column can be thought of as representing a component of that piece of data. For example, if we have a table for tracking points information, then the columns may include information such as Latitude, Longitude, and Street names or Segment IDs as shown in FIG. 15. As a result, when we specify a table, we include the column headers and the type of data for each column. We may also decide to place certain limitations, or constraints, to guarantee that the data stored in the table makes sense.

The latitude and longitude coordinates are in decimal degrees for database and programming use. Typical consumer-grade GPS units (e.g. Garmin GPS Map 76C) will deliver 1-3 m accuracy. For that grade of GPS, reporting 5 decimal places will preserve a precision of 1.1 m accuracy. An Example:
Latitude N 41° 5' 3.588"=41.08432976612652°
Longitude W 81° 30' 51.4938"=−81.51430423111378°

For reporting 5 decimal places the Latitude will be 41.08432 and the Longitude will be −81.51430. For programming purposes and database design, the Latitude and the Longitude values will be used as:
Latitude 41.08432, LatA=41.0
Longitude −81.51430, LonA=−81.5

FIG. 14 shows SQL table. In that table a city or a region is divided into a number of geographic sections each section is about 8-20 by 8-20 miles, and identified by its LatA and LonA.

Additionally, one or more table could represent one or more city or geographic section.

The table Section_Location is comprises three columns, the 1st column for LatA, 2nd column for LonA and the last column for location ID. For example, the position Latitude 41.07629, Longitude −81.52229 has LatA=41.0 and LonA=−81.5, by applying the SELECT SQL command for Location ID, WHERE LatA=41.0 AND LonA=−81.5, the result will be 44308.

44308 is the actual zip code for downtown the city of Akron, Ohio where the Latitude 41.07629, Longitude −81.52229 of this position belong.

Distance Between the Vehicle and an Intersection in Meters
Latitude of the vehicle−Latitude of the intersection=Y
Longitude of the vehicle−Longitude of the intersection=X
Distance=$1.112\sqrt{\text{square root over }(X*X+Y*Y)}$ Naming and Coding Streets For streets located inside a geographic area inside the processing map which is coupled to the processing software:

For the purpose of creating the database elements required to run the in-vehicle traffic light system autonomously inside the vehicle we must follow the following rules to allow the in-vehicle software "programming code" to calculate and predict the following mathematic steps:

A street can take a single or more alphabet letter (or other type of coding) to define it or to define a section of a street as shown in FIGS. 9-13.

Two streets or sections must not have the same name "code" inside the same geographic section.

A street or a section of street has to be defined as horizontal or vertical, for instance, code 2 for horizontal orientation, code 1 for vertical orientation.

A geographic section can be an area of 8-20 miles by 8-20 miles for example, as shown in FIG. 14.

Coding Intersections

Intersections on certain streets must follow the following rules:

For horizontal streets, numbering ascending eastbound as shown in FIG. 10, for vertical streets, numbering ascending northbound for example as shown in FIG. 11.

Ascending eastbound for numbering the intersections on a horizontal road makes the in-vehicle software to calculate and predict the following consecutive intersections from the database after determining a first intersection on that road.

Similarly, ascending northbound for numbering the intersections on a vertical road makes the in-vehicle software to calculate and predict the following consecutive intersections from the database after determining a first intersection on that road too, to be used extensively in the virtual preemption system.

Note: ascending or descending numbering of the intersections could be done in many ways as soon as the in-vehicle software can predict the upcoming intersections the vehicle is approaching based on the vehicle's heading and the orientation of the segment.

When two streets intersect, the intersection must have a different code for each street as shown in FIG. 12 and FIG. 13.

Intersection F01 belongs to street F and intersection E03 belongs to street E, intersection F01 and E03 has the same latitude/longitude and the same traffic Case and the same threshold delay time "which is disclosed with great details in the following paragraphs", basically, intersection F01 and E03 are the same intersection.

When two streets join to form one street, the joint intersection must have a different code for each street as shown in FIG. 9. Intersection C01 belongs to street C and intersection D01 belongs to street D. Intersection C01 and D01 has the same latitude/longitude.

The intersection is defined by its street code and its number "the intersection code is the intersection identification" as shown in FIG. 10, the street code is A and the intersections are A01,A02,A03,A04 and A05. For FIG. 11, the street code is B and the intersections are B09, B10 and B11.

In the processing map, each predefined intersection is marked and coded and each leg segment is coded by at least one volume size code and an orientation code which is either vertical or horizontal, the center points of predefined intersections and track drop points are marked to extract the latitude/longitude coordinates associated with these intersections and associated with these track points from the map, the processing software is arranging the leg segment identification based on the segment orientation code and the two intersections codes of this segment, the processing software also arranging the intersection identification, the latitude/longitude coordinates of their centers, the selected predefined Cases, and the threshold delay times for the predefined Cases. A predefined Case stored in the database as green and turning arrow times for just one segment for each road orientation "as the most preferred embodiment".

Note: the two-road intersection only has one vertical orientation and one horizontal orientation, the three-road intersection has three road orientations.

Note: the red time is calculated and determined by the in-vehicle software based on the Case's times and the Case Model's programming code associated with this Case, the yellow time is a selected value such as 6 or 7 seconds. Similarly, in case of storing the Case as red and turning arrow times, the in-vehicle software can calculate the green times.

Traveling between two consecutive intersections on a same street can determine the in-vehicle Cases at the upcoming intersections consecutively, also can determine the coordinates of these intersections. The joined streets are considered a same street for the emergency vehicle virtual preemption system.

When making a right or left turn at an intersection of two or more streets, traveling between two consecutive intersections on the new street can determine the Cases at the upcoming intersections consecutively on the new street, also can determine the coordinates of these intersections.

For the database, there is a first table to locate the geographic section 79 based on the Latitude/Longitude of the traveling vehicle as shown in FIG. 14. A second table to locate the segment identification and then the in-vehicle software extracts the intersection identifications from the segment identification, wherein the vehicle is traveling between these two intersections based on the Latitude/Longitude of the traveling vehicle as shown in FIG. 15, a third table to determine the in-vehicle traffic Case IDs, the threshold delay time for the Cases for the upcoming intersections and their Latitude/Longitude based on, the intersection ID, the heading of the vehicle and the segment orientation as shown in FIG. 16. And a fourth table to provide the time phases for a Case as shown in FIG. 17.

Conventional Traffic Controller

A traffic signal is typically controlled by a controller inside a cabinet mounted on a concrete pad. Some electro-mechanical controllers are still in use. However, modern traffic controllers are solid state. The cabinet typically contains a power panel, to distribute electrical power in the cabinet; a detector interface panel, to connect to loop detectors and other detectors; detector amplifiers; the controller itself; a conflict monitor unit; flash transfer relays; a police panel, to allow the police to disable the signal; and other components.

Phases and Stages

Traffic controllers use the concept of phases, which are directions of movement grouped together. For instance, a simple crossroads may have four vehicle movement phases: North, East, West and South. There may be additional phases for pedestrian movements as well.

A stage is a group of phases which run at the same time. A simple crossroads may have two stages: North and South, and West and East. It is important that phases in a stage do not conflict with each other.

The In-Vehicle Virtual Traffic Controller "Case Models" of the Present Invention A Case Model is a block of a programming code which is part of the in-vehicle software, a Case Model runs an entire intersection in all directions with a manner similar to the actual traffic controller, wherein all Stages "groups of phases" of an intersection do not conflict with each other when they run at the same time.

In the present invention; each leg segment is represented by a respective stage inside a Case Model based on the segment orientation and the heading of the vehicle, since the leg segment could be a vertical segment and the vehicle's heading could be either northbound or southbound, or the leg segment could be a horizontal segment and the vehicle's heading could be either eastbound or westbound.

Additionally, the Case Model is acting as a mathematic relationship to coordinate all the stages of an intersection, and each segment orientation and direction of movement approaching the intersection activates its respective part of the Case Model's programming code, therefore the Case Model is a virtual traffic controller.

Depending on the size of traffic in each segment and the heading of vehicles during the different hours of the day we can generate as many Cases that run on a number of Case Models to be assigned for predefined intersections by the processing software. A single intersection could be assigned more than one Case to represent the change of traffic size during the hours of the day from low to high or high to medium for example.

Another objective in designing the Case Models and the Cases' times of the present invention is to mimic the dynamic control of traffic at an intersection (actuated control system in which the fixed time light cycle mimics the average time of the actuated traffic light cycle for each leg segment for each direction at intersections based on the traffic volume history of the roads).

Coordinated Control

Attempts are often made to place traffic signals on a coordinated system so that drivers encounter a green wave, a long string of green lights (the technical term is progression).

Traffic lights must be instructed when to change stage and they are usually coordinated so that the stage changes occur in some relationship to other nearby intersections or to the press of a pedestrian button or to the action of a timer or a number of other inputs.

In modern coordinated signal systems, it is possible for drivers to travel long distances without encountering a red light.

Therefore, the purpose of the "threshold delay time" for the Cases of the present invention is to create Coordinated control to allow progression so that the stage changes occur in some relationship to other nearby intersections which are assigned a number of Cases by manipulating the beginning time of each Case at nearby intersections.

Generally, the present invention created at least 10 Case Models to cover every possible scenario of road intersections from Stop Sign and Caution to heavy traffic, a number of predefined Cases run on each Case Model. Around 60 predefined Cases run on these few Case Models can cover almost all intersection scenarios. As being previously described, the Case holds the values of green and arrow turning times for just one segment per each orientation. The predefined Cases database is accessed by the processing software to assign the proper Case to the target intersection.

The Case Model basically represent the traffic size in each segment of the intersection, for instance as the following:
Some Case Models without times:
A Case Model for stop sign at each segment (4-way stop).
Another Case Model for flashing yellow/flashing red for vertical segments (continuous green traffic signal in the heavy traffic road).
Another Case Model for flashing yellow/flashing red for horizontal segments.

There is also a Case Model (Case Model1) for a simple intersection (under medium traffic in all segments) without left turning signal.

Another Case Model (Case Model 2) for heavy traffic in all segments of the intersection or in just one road of the intersection (in which, the left turning signal activates during the red light phase of a same segment).

And other four Case Models (Case Models 3,4,5 and 6), in these four Case Models the traffic size in one segment of a specific orientation is bigger than the traffic size in the other segment of the same orientation.

Figure 21:
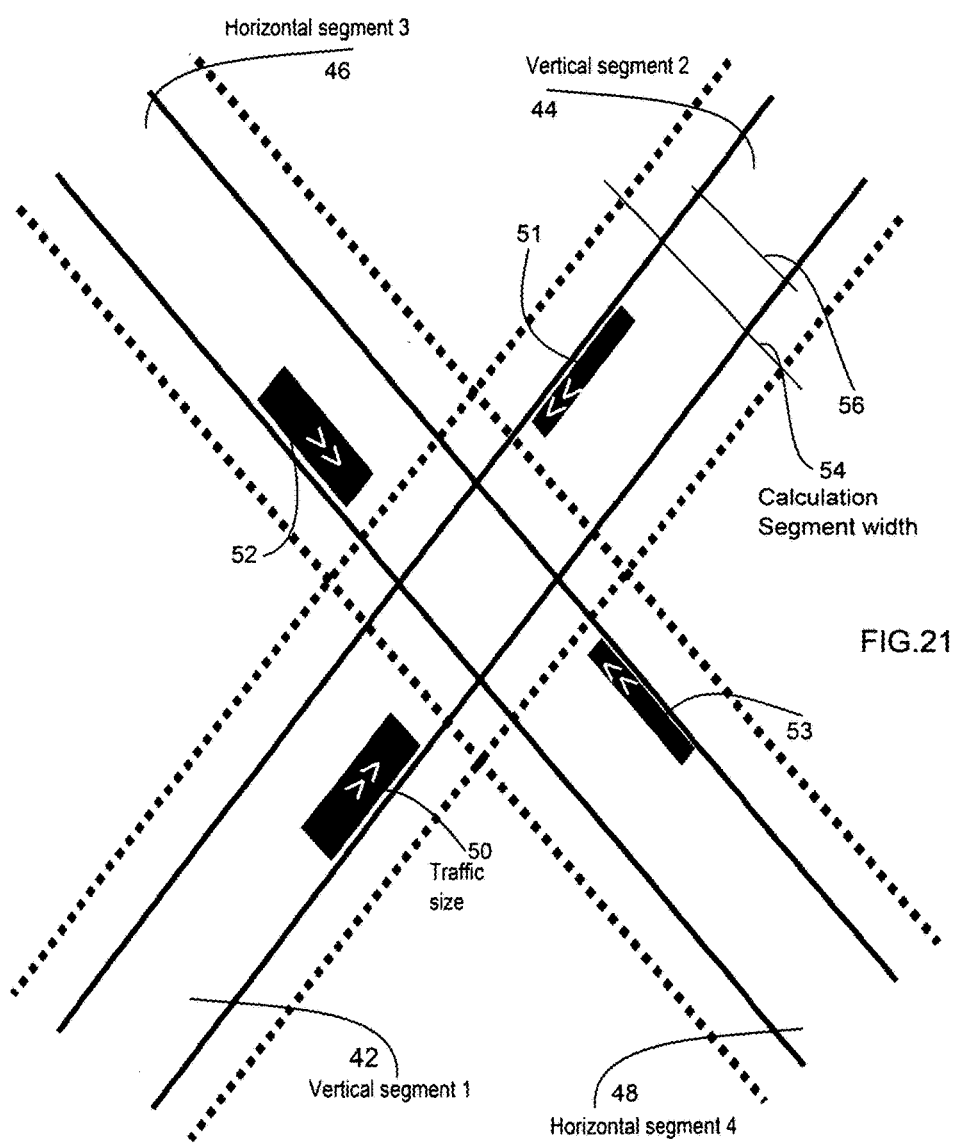
FIG. 21 Illustrates an example of a Case Model at an intersection.

FIG. 21 shows an example of a Case of a Case Model 3 type runs on Case Model 3 at an intersection, providing different values for green and arrow times, the processing software can create at least 6 different Cases run on this Model, manipulating the green and the arrow times are calculated based on the traffic volumes during the hours of the day to represent busy traffic, medium traffic and low traffic, these 6 Cases of a Case Model 3 type hold the manipulated times as preset values.

The times values include;
Green signal time selected for segment 1 of vertical orientation.
Note: traffic size in segment 1 is bigger than traffic size in segment 2 which is also of vertical orientation.
Green signal time selected for segment 3 of horizontal orientation.
Note: traffic size in segment 3 is bigger than traffic size in segment 4 which is also of horizontal orientation.
The left turning signal time selected for segment 1.
The left turning signal time selected for segment 3.

FIG. 17 shows an example for different times values for a number of Cases run on the Case Models 3,4,5 and 6, for instance Case 30 of Case Model 3 type has times values equal to 90 80 20 20.
The first 2 digits 90 are the green time in seconds for segment 1.
The next 2 digits 80 are the green time in seconds for segment 3.
The next 2 digits 20 are the left turning time in seconds for segment 1.
The next 2 digits 20 are the left turning time in seconds for segment 3.

The intersection of FIG. 21 has four leg segments, (segment 1) 42 is a vertical segment and its traffic volume 50 approaching the intersection is higher than the traffic volume 51 in (segment 2) 44 which is also a vertical segment. Thus, (the group of phases in segment 1) start the traffic phases (its respective part of the Case Model 3 assigned to the four legs) with green signal (straight) and left turn green signal arrow for a period of time equal to the left turning time (assigned to segment 1 by the Case), while (the group of phases in segment 2) start the traffic phases with red signal for a period of time equal to the left turning time of segment 1 plus 2 seconds for red clearance. After that, both of segment 1 and segment 2 have green signal (straight) for the remaining time of the whole green signal time of segment 1 assigned by the Case, then followed by synchronized 7 seconds of yellow signal in both segment 1 and segment 2, then followed by synchronized red signal in both segment 1 and segment 2 equal to (the whole green signal time of segment 3 assigned by the Case plus 7 seconds of yellow time plus 4 seconds for red signal clearance). For the horizontal (segment 3) 46 which has more approaching traffic 52 than the horizontal (segment 4) 48 of traffic 53, both of segments 3 and 4 start their phases by synchronized red signal equal to (the whole green signal time of segment 1 assigned by the Case plus 7 seconds of yellow time plus 2 seconds for red signal clearance, then followed by green signal (straight) and left turn green signal arrow for a period of time equal to the left turning time (assigned to segment 3 by the Case) for segment 3. While followed by red signal for a period of time equal to the left turning time of segment 3 plus 2 seconds for red clearance for segment 4. Then followed by synchronized green signal (straight) in both segment 3 and segment 4 for the remaining time of the whole green signal time of segment 3 assigned by the Case. Then followed by synchronized 7 seconds of yellow signal in both segment 3 and segment 4. Then followed by synchronized 2 seconds of red signal in both segment 3 and segment 4 for all red clearance.

Note: For orientation code=1:
course=the GPS receiver module's course in degrees.
northbound=(course<89 OR course>271)
southbound=(course<269 AND course>91)
For orientation code=2:
eastbound=(course<179 AND course>1)
westbound=(course<359 AND course>181)
An example of Case Model 3 programming code block:
DISS=the calculated distance between the vehicle and the upcoming intersection based on the Latitude/Longitude of the vehicle and the Latitude/Longitude of the intersection center.
Converting the current time into seconds:
a=hour*3600 sec
b=minute*60 sec
c=second sec
Total Time In Seconds=T Time=a+b+c
GRT1=green time assigned for segment 1
GRT3=green time assigned for segment 3
LAT1=the left turning time assigned for segment 1 (the last 5 seconds of it for yellow turning arrow)
LAT3=the left turning time assigned for segment 3 (the last 5 seconds of it for yellow turning arrow)
YLT=yellow time phase for all stages=7 seconds
CYT=The Cycle Time=GRT1+2*YLT+GRT3+4
DCY=threshold delay time in seconds for this Case.
number of repeated cycles=(T Time−DCY)/CYT
TTFC=the total time of full cycles=CYT*whole number of repeated cycles
pass Time=passed time from last cycle=(T Time−DCY−TTFC)
DIR=1 for vertical segment 1 or vertical segment 2 "the orientation code of segment 1 or 2"
DIR=2 for horizontal segment 3 or horizontal segment 4 "the orientation code of segment 3 or 4"
course=the GPS receiver module's course in degrees.
For orientation code=1:

```
north=(course<89 OR course>271)
south=(course<269 AND course>91)
For orientation code=2:
    east=(course<179 AND course>1)
    west=(course<359 AND course>181)
for Index in 0 . . . 1000 {
if((0<=passTime&&passTime<GRT1)
    &&north&&DIR==1){show green light inside segment 1}
if (GRT1<=passTime && passTime<GRT1+YLT && north
    && DIR==1) {show yellow light inside segment 1}
if (GRT1<=passTime && passTime<GRT1+YLT && north
    && DIR==1 && DISS<350) {show big yellow light inside
    segment 1}
if (GRT1<=passTime && passTime<GRT1+YLT && north
    && DIR==1 && DISS<200 && DISS>100) {start the
    audio alert inside segment 1}
if ((GRT1+YLT)<=passTime && passTime<=(GRT1+
    2*YLT+GRT3+4) && north && DIR==1) {show red light
    inside segment 1}
if ((GRT1+YLT)<=passTime && passTime<=(GRT1+
    2*YLT+GRT3+4) && north && DIR==1 && DISS<350)
    {show big red light inside segment 1}
if ((GRT1+YLT)<=passTime && passTime<=(GRT1+
    2*YLT+GRT3+4) && north && DIR==1 && DISS<200
    && DISS>100) {start the audio alert inside segment 1}
if(0<=passTime          &&passTime<=LAT1-5
    &&north&&DIR==1 &&DISS<350) {show the green turn-
    ing light arrow inside segment 1}
if(LAT1-5<passTime          &&passTime<=LAT1
    &&north&&DIR==1 &&DISS<350) {show the yellow
    turning light arrow inside segment 1}
if (LAT1<passTime && passTime<GRT1 && south &&
    DIR==1){show the green light inside segment 2}
if (GRT1<=passTime && passTime<GRT1+YLT && south
    && DIR==1) {show the yellow light inside segment 2}
if (GRT1<=passTime && passTime<GRT1+YLT && south
    && DIR==1 && DISS<350) {show the big yellow light
    inside segment 2}
if (GRT1<=passTime && passTime<GRT1+YLT && south
    && DIR==1 && DISS<200 && DISS>100) {start the
    audio alert inside segment 2}
if (0<=passTime && passTime<=LAT1 && south &&
    DIR==1) {show the red light inside segment 2}
if (0<=passTime && passTime<=LAT1 && south &&
    DIR==1 && DISS<350) {show the big red light inside
    segment 2}
if (0<=passTime && passTime<=LAT1 && south &&
    DIR==1 && DISS<200 && DISS>100) {start the audio
    alert inside segment 2}
if (GRT1+YLT<=passTime && passTime<=(GRT1+
    2*YLT+GRT3+4) && south && DIR==1) {show the red
    light inside segment 2 for stage 2}
if (GRT1+YLT<=passTime && passTime<=(GRT1+
    2*YLT+GRT3+4) && south && DIR==1 && DISS<350)
    {show the big red light inside segment 2}
if (GRT1+YLT<=passTime && passTime<=(GRT1+
    2*YLT+GRT3+4) && south && DIR==1 && DISS<200
    && DISS>100) {start the audio alert inside segment 2}
if(0<=passTime&&passTime<(GRT1+YLT+2)
    &&east&&DIR==2){show the red light inside segment 3}
if (0<=passTime && passTime<(GRT1+YLT+2) && east
    && DIR==2 && DISS<350) {show the big red light inside
    segment 3}
if (0<=passTime && passTime<(GRT1+YLT+2) && east
    && DIR==2 && DISS<200 && DISS>100) {start the
    audio alert inside segment 3}
if ((GRT1+YLT+2)<=passTime && passTime<(GRT1+
    GRT3+YLT+2) && east && DIR==2) {show the green
    light inside segment 3}
if ((GRT1+YLT+2)<=passTime && passTime<=(GRT1+
    YLT+LAT3-3) && east && DIR==2 && DISS<350)
    {show the green turning light arrow inside segment 3}
if     ((GRT1+YLT+LAT3-3)<passTime     &&    pass
    Time<=(GRT1+YLT+LAT3+2) && east && DIR==2 &&
    DISS<350) {show the yellow turning light arrow inside
    segment 3}
if ((GRT1+GRT3+YLT+2)<=passTime && passTime
    <(GRT1+YLT+GRT3+YLT+2) && east && DIR==2)
    {show the yellow light inside segment 3}
if ((GRT1+GRT3+YLT+2)<=passTime && passTime
    <(GRT1+YLT+GRT3+YLT+2) && east && DIR==2 &&
    DISS<350) {show the big yellow light inside segment 3}
if ((GRT1+GRT3+YLT+2)<=passTime && passTime
    <(GRT1+YLT+GRT3+YLT+2) && east && DIR==2 &&
    DISS<200 && DISS>100) {start the audio alert inside
    segment 3}
if (GRT1+YLT+GRT3+YLT+2<=passTime && pass-
    Time<=(GRT1+YLT+GRT3+YLT+4)&&east&&DIR==2)
    {show the red light inside segment 3}
if (GRT1+YLT+GRT3+YLT+2<=passTime && pass-
    Time<=(GRT1+YLT+GRT3+YLT+4)
    &&east&&DIR==2&&DISS<350){show the big red light
    inside segment 3}
if (GRT1+YLT+GRT3+YLT+2<=passTime && pass-
    Time<=(GRT1+YLT+GRT3+YLT+4)
    &&east&&DIR==2&&DISS<200 &&DISS>100){start the
    audio alert inside segment 3}
if(0<=passTime&&passTime<(GRT1+YLT+LAT3+4)
    &&west&&DIR==2) {show the red light inside segment 4}
if(0<=passTime&&passTime<(GRT1+YLT+LAT3+4)
    &&west&&DIR==2&& DISS<350) {show the big red light
    inside segment 4}
if(0<=passTime&&passTime<(GRT1+YLT+LAT3+4)
    &&west&&DIR==2&& DISS<200 && DISS>100) {start
    the audio alert inside segment 4}
if((GRT1+YLT+4+LAT3)<=passTime&&passTime<
    (GRT1+GRT3+YLT+2) && west && DIR==2) {show the
    green light inside segment 4}
if ((GRT1+GRT3+YLT+2)<=passTime && passTime
    <(GRT1+YLT+GRT3+YLT+2) && west && DIR==2)
    {show the yellow light inside segment 4}
if ((GRT1+GRT3+YLT+2)<=passTime && passTime
    <(GRT1+YLT+GRT3+YLT+2) && west && DIR==2 &&
    DISS<350) {show the big yellow light inside segment 4}
if ((GRT1+GRT3+YLT+2)<=passTime && passTime
    <(GRT1+YLT+GRT3+YLT+2)&&west&&DIR==2
    &&DISS<200 &&DISS>100){start the audio alert inside
    segment 4}
if (GRT1+YLT+GRT3+YLT+2<=passTime && passTime
    <(GRT1+YLT+GRT3+YLT+4)&&west&&DIR==2){show
    the red light inside segment 4}
if (GRT1+YLT+GRT3+YLT+2<=passTime && passTime
    <(GRT1+YLT+GRT3+YLT+4)
    &&west&&DIR==2&&DISS<350){show the big red light
    inside segment 4}
if(GRT1+YLT+GRT3+YLT+2<=passTime && passTime
    <(GRT1+YLT+GRT3+YLT+4) && west && DIR==2 &&
    DISS<200 && DISS>100){start the audio alert inside seg-
    ment 4}
}.
```

The other three Case Models (4,5,6) similar to the previous Case Mode 3 cover alternative scenarios when the traffic size in segment 2 is bigger than the traffic size in segment 1 and the traffic size in segment 3 is bigger than the traffic size in segment 4, also when the traffic size in segment 2 is bigger than the traffic size in segment 1 and the traffic size in segment 4 is bigger than the traffic size in segment 3, also when the traffic size in segment 1 is bigger than the traffic size in segment 2 and the traffic size in segment 4 is bigger than the traffic size in segment 3.

In the above four Case Models the left turning signal activates during the green signal phase of same segment.

FIGS. 18 and 19 show an example of multi-leg Case Model (Case Model 7) for multi-leg intersection, in this Case Model each leg is coded to activate specific part of the multi-leg Case Model (the left turning signal activates during the red light phase of same segment).

In the 6-leg intersection of FIG. 18, the street BRI intersects with both LAN and WOD streets, and the street LAN intersects with both BRI and WOD streets, the intersections BRI19, LAN15 and WOD22 are the same intersection with the same coordinates and assigned the same Case. For instance, the two leg segments on BRI street are vertical, the two leg segments on LAN street are horizontal, and the two leg segments on WOD street are horizontal too.

The first leg on BRI street takes order 1, 2nd leg on LAN street takes order 2, 3rd leg on WOD street takes order 3, 4th leg on BRI street takes order 4, 5th leg on LAN street takes order 5 and the last leg on WOD street takes order 6.

The legs assigned Cases 70 71 72, of Case Model 7 type, Case 70 for the heavy size hours period, Case 71 for medium size hours period and finally Case 72 for low size hours period, each leg triggers its respective part of the Case Model's code based on its order and based on a Case ID associated with each time period.

Note: there is a few seconds of yellow interval signal such as 6 seconds plus 2 or 3 seconds of all way red signal clearance, as a smooth transition from one Case to another at a same intersection when the Case of busy or medium or low traffic hours period flips to a different Case of a different traffic hours period, where a signal phase in a segment of this intersection has green signal in the Case before flipping to a new Case in which the same segment has red phase signal.

In another embodiment of coding the 3-road intersection:
The two segments of BRI street take the segment orientation code 1 for northbound and southbound heading.
The two segments of LAN street take the segment orientation code 2 for eastbound and westbound heading.
The two segments of WOD street take the segment orientation code 3 for eastbound and westbound heading.

In this scenario each leg segment triggers its respective part of the Case Model's code based on its orientation code and the heading of the vehicle.

The following is an example of how to represent traffic changes during a 24 hour day:
high traffic period=(7<=hour AND hour<10) OR (14<=hour AND hour<17)
medium traffic period=(10<=hour AND hour<14) OR (17<=hour AND hour<21)
low traffic period=(21<=hour AND hour<=24) OR (0<=hour AND hour<7)

FIG. 19 shows an example of few Cases of Case Model 7 type run on Case Model 7, Case 70 has times 60 50 45 20 20 20.

Green signal time in segment 1 is 60 seconds, green signal time in segment 3 is 50 seconds, green signal time in segment 5 is 45 seconds.

Left turning arrow times in segment 1, segment 3, or segment 5 is 20 seconds, segments 1 and 2 have same stage (they run same phases at the same time), segments 3 and 4 have same stage and segments 5 and 6 have same stage.

In one Case of flashing yellow/flashing red which runs on Case Model flashing yellow/flashing red, the flashing red is displayed as flashing red only or as flashing red followed by stop sign image, while flashing yellow is not displayed in case of flashing yellow/flashing red represents a Case of a heavy traffic in one road intersects with another road of extremely low traffic (as commonly seen in side streets with stop sign intersect with a heavy traffic road).

FIG. 20 and FIG. 15 show the relation between the intersections WIL13 of coordinates 80 and WIL14 of coordinates 82 and the horizontal segment 2WIL1314 between them, because the segment center line is a straight line between the point 80 and the point 82, the two points 80 and 82 are sufficient enough to represent the segment 2WIL1314 when using triangulation to check if a vehicle traveling between them is not outside the segment.

The intersections BRO20 of coordinates 86 and BRO21 of coordinates 82 have no one-straight line to connect between the two intersections, therefore the point Pt1 of coordinates 84 is dropped to represent the curvature of the vertical segment 1BRO2021. Thus, the segment 1BRO2021 is repeated twice, once between point 82 and point 84, the 2nd time between point 84 and point 86. Similarly for intersections HIG10 of coordinates 94 and HIG11 of coordinates 88 have no one-straight line to connect between the two intersections, therefore the point Pt2 of coordinates 92 and Pt3 of coordinates 90 are dropped to represent the curvature of the vertical segment 1HIG1011.

FIG. 16 shows the relation between intersection IDs of horizontal and vertical segments of same intersection and the assigned Cases. The intersection WIL13 for horizontal segment 2WIL1314 and intersection HIG11 for vertical segment 1HIG1011 have same coordinates and assigned Cases 10 10 02. It is very obvious that WIL13 and HIG11 are the same intersection.

The first two digits 10 for Case 10 for busy hours traffic runs on Case Model 1, then next two digits 10 for Case 10 for medium traffic also runs on Case Model 1and then next two digits 02 for the Case 02 for low traffic, Case 02 represents a Case Model flashing yellow/flashing red at an intersection, Case 10 represents a Case Model for a simple intersection without left turning signal. In this example high traffic hours and medium traffic hours are assigned the same Case.

As being mentioned before, there are a few seconds of yellow interval light signal such as 6 seconds plus 2 or 3 seconds of all way red signal clearance, as a smooth transition from one Case to another at a same intersection when the Case of heavy or medium or low traffic hours period flips to a different Case of a different traffic hours period, wherein, when a signal phase in a segment of this intersection has green signal in the Case before flipping to a new Case in which the same segment has red phase signal.

The in-Vehicle Autonomous Road Sign Images:

A database of track points similar to the database used for the leg segments is used to display road sign images for designated directions as shown in FIG. 22. Also, there are road sign images such as school zone signs 11 and the flashing yellow bar 38 as in FIG. 4 for designated days and time (the school sign along with the flashing yellow bar 38 appear only during certain hours inside the school days) along with audio beeping alert.

Additionally, depending on the traffic volume of the roads during the hours of the day, or depending on the seasons or road conditions, some of the road sign images are displayed to represent the change of traffic volume such as increasing the speed limits during the low traffic hours. Thus, the present road sign images system provide a method to display variable speed limits and alerting road sign images for designated seasons, days and hours based on weather condition history and traffic history of the roads.

FIG. 20 and FIG. 22 show a horizontal section of Wilbeth RD between the point of coordinates 80 and the point of coordinates 82 and the road sign image ID 2 10 11 12 13 between them for both eastbound and westbound headings.

For the Sign ID 2 10 11 12 13: the first digit 2 means the road sign images for horizontal section of road, the next two digits 10 means a road sign image number 10 "SPEED LIMIT 30" for example and next two digits 11 means road sign image number 11 "HIDDEN DRIVE" for example. The "SPEED LIMIT 30" and "HIDDEN DRIVE" road sign images appear on the LCD 40 when heading eastbound, and road sign images number 12 and 13 appear on the LCD 40 when heading westbound.

The above example explained that the road sign images are displayed with high clarity at every location between the point of coordinates 80 and the point of coordinates 82, whereas the actual road signs only as good when approached in close proximity until they are behind the vehicle, and this leads to install extra actual road signs, thus, the increasing costs.

Similarly, the road sign image ID 1 14 15 16 17 between the point of coordinates 82 and the point of coordinates 84 of a vertical section of Brown St, the first digit 1 means the road sign images for vertical section of road the next two digits 14 and next two digits 15 means road sign images number 14 and 15 appear on the LCD 40 when heading northbound, and road sign images number 16 and 17 appear on the LCD 40 when heading southbound.

The road sign images database holds few hundred images to cover all known road signs standardized by federal regulations, most notably in the Manual on Uniform Traffic Control Devices (MUTCD) and its companion volume the Standard Highway Signs (SHS). Also the Vienna Convention on Road Signs and Signals standards.

Note: stop sign image in the present invention is treated as part of the traffic Case Models since the stop sign could represent part of flashing yellow/flashing red Case assigned for (high or medium or low)/extremely-low traffic hours at an intersection which may be assigned different Cases during busy traffic hours.

Override the Segments:

When a vehicle approaching the intersection there is a big chance that the vehicle is in more than one segment at the same time because segments width interfere with one-another and also because the vehicle's course could fit the vertical and the horizontal segment at the same time, and since the present system uses Calculation width 54 (as a selected value) as seen in FIG. 21, this width 54 is always bigger than the actual width 56 to cover as much of a segment with fewer drop points regardless the actual width of the segments. Therefore, a timer and a distance counter are used to verify the exact segment the vehicle is traveling on to eliminate all the chances of interference, the more time and distance inside a segment the more likely to override other segments and to ignore them. Additionally, as shown in FIG. 23 the deviation angle 99 between the vehicle's longitudinal axis 98 and the center line of the leg segment 95 accurately verify the exact leg segment the vehicle 96 is traveling on since this deviation angle 99 is close to zero degrees when the vehicle's axis 98 is almost parallel to the center line 95 of the leg segment, therefore, the closer to zero degrees the deviation angle 99 is the more likely to override other segments which have bigger angles.

The same concept of timers, distance counters and the angles between the vehicle's longitudinal axis and the center line of road segments is used for displaying the images of road signs without interference caused by roads width.

Figure 5:
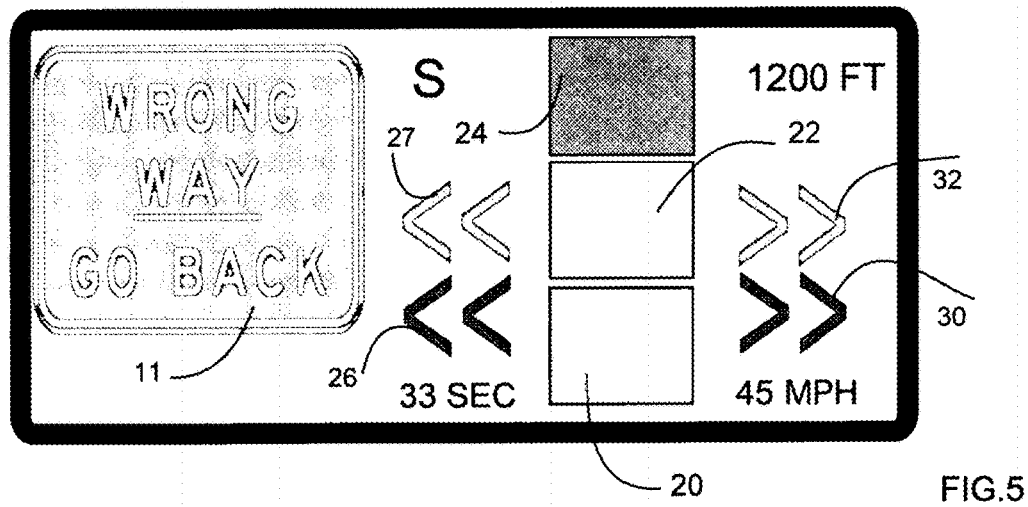

One-Way Roads:

In one way streets if a driver headed in the wrong direction of traffic, the LCD 40 displays a road sign image 11 "WRONG WAY" for example as shown in FIG. 5 along with the audio alert beeping to alert the driver to correct his heading.

To build the database of the latitude/longitude coordinates, the intersections leg segments, the Cases and threshold delay times, and database of road sign images. All together are the elements required to run the present in-vehicle traffic light system autonomously without relying on an external server or a broadcast station or a wireless network to provide traffic light information for vehicles.

Also without relying on a wireless communication between vehicles nor relying on wireless communication between traffic equipments at road intersections and vehicles to provide traffic light information for vehicles.

The database tables shown in FIG. 15 are designed to initiate the segment search to determine intersection IDs of two intersections the vehicle traveling between them based on the vehicle latitude/longitude, after that the vehicle can predict the upcoming intersection IDs based on the direction of traveling. Therefore, the vehicle knows the status of the traffic Case at each upcoming intersection ahead of time even before the vehicle reaches these intersections, and in case of a green signal phase for proceeding followed by a red light phase in the next approaching intersection the green LED indicator 61 may start blinking to warn the driver of the upcoming stop at the next intersection especially if the intersections are located in close proximity. Therefore, even there is a weak or no GPS signal for short time caused by tall buildings blocking the GPS satellite signals, the functionality of the system is not affected. Also by knowing the latitude/longitude of the upcoming intersections ahead of time, the vehicle can calculate the Safe Distance and the Stopping Distance ahead of time to be prepared for Running Red Lights avoidance.

Triggering Conventional Green Traffic Signal at Heavy Traffic Roads

If you drive a car, bike, or motorcycle or as a pedestrian, chances are you regularly experience the frustration of waiting at red traffic lights that seem to take forever to change. Some actuated traffic lights are designed to keep heavy traffic traveling with green lights until they detect vehicles that arrive at a cross street and change accordingly.

Once a vehicle is detected by an inductive loop detector or camera detection, or a pedestrian initiates a traffic signal change using the available crosswalk buttons, the traffic light system is signaled that there is someone waiting to proceed. The lights for the cross traffic will then begin to change after a safe time period before the light turns green for you.

THUS, in order for the present in-vehicle autonomous virtual traffic light system to achieve the goal of replacing the conventional equipments at street intersections, the following methods are adopted by the present invention.

Triggering green traffic signal and turning traffic signal on a heavy traffic road are disclosed as the following:

As being disclosed with great details in the present system, the database tables shown in FIGS. 15-16 and 18 are designed to initiate the leg segment search to determine intersection IDs of two intersections the vehicle traveling between them based on the vehicle latitude/longitude, after that the vehicle can predict and extract the upcoming intersection ID from the segment ID based on the direction of movement. Therefore, the vehicle can determine the upcoming intersection coordinates, the intersection ID, the segment orientation, the traffic Case at the upcoming intersection, the vehicle's coordinates, and the heading, and the current date/time. The concept of actuated traffic signals designed to keep heavy traffic traveling with green signal until they detect a vehicle arrives at a cross street and change accordingly is adopted by the present system, especially since the vehicle unit V10 comprises a long range transceiver module. Therefore, when vehicles traveling on a heavy traffic street and approaching an intersection assigned the continuous green traffic Case (a Case runs on the flashing yellow/flashing red Case Model), they receive radio signal from a vehicle approaching this intersection from the cross street (low traffic street), this radio signal is carrying the intersection ID, the segment orientation of the low traffic street (the segment it travels on), a time at which the vehicle on the low traffic street activates the crossing request, this time is referred herein as (time stamp), also the signal is carrying the heading of the vehicle on the low traffic street and a code C (to represent crossing for example). All vehicles traveling on the heavy traffic street use these data to flip the green signal to few seconds of yellow signal (6 seconds for example) before flipping to red signal for 15 seconds to give access to all vehicles on the low traffic street to have 9 seconds of green signal plus 6 seconds of yellow signal, the 6 seconds plus the 15 seconds are referred herein as (the temporary cycle, this cycle contains 2 or 3 seconds of all way red clearance too), the vehicles on the heavy traffic street are periodically transmitting the same received data during the temporary cycle (until these vehicles exit this intersection) to other vehicles approaching this intersection to allow them to determine the remaining time of the temporary cycle. Additionally, bikes, motorcycles or pedestrians can apply the same method to trigger the green signal when sending the radio signal.

Note: When a vehicle moves from one leg segment to another of same intersection, this means that the vehicle exited this intersection.

Similarly, the same concept is used to provide turning signal for vehicles traveling on a heavy traffic street approaching an intersection assigned continuous green traffic Case, when a vehicle traveling on the heavy traffic street activates the turning request, it transmits a radio signal, this signal is carrying the intersection ID, the segment orientation of the heavy traffic street (the segment it moves on), the time stamp when the vehicle activates the turning request, the heading of the vehicle and a code T (to represent turning for example). All vehicles traveling on the heavy traffic street approaching this intersection use these data to check if they are in the opposite heading to flip to the temporary cycle to give access to vehicles traveling on the heavy traffic street with heading matching the heading of the vehicle that requested the turning access, the vehicles on the heavy traffic street with the opposite heading is periodically transmitting the same received data during the temporary cycle (until these vehicles exit this intersection) to other vehicles approaching this intersection to allow them to determine the remaining time of the temporary cycle.

The 4-Way Stop Common Rule:

When you approach a 4-way stop, whether it's at a traffic light or stop sign, it's important to slow down and come to a complete stop. You'll want to pay attention and take notice if there are any other vehicles stopped around you or any vehicles coming up to the 4-way stop.

It's important to make sure that you have come to a complete stop within the indicated lines on the road. You can move forward if you have trouble seeing, but only after you've come to a complete stop. Failing to do so could result in a traffic ticket.

Take a look around and see if there are any other vehicles at the 4-way stop. Of course, if you're the only vehicle at the stop, then you have the right of way and are free to go. Vehicles leave the stop sign or traffic light in the same order in which they arrived at the stop. Therefore, if you arrive at a 4-way stop first, then you get to leave first. If you're the last person to arrive at the stop, then you will have to wait until the other three cars have moved on before you can do the same.

There are times when vehicles will arrive at a 4-way stop at the same time. Therefore, when this occurs, it's important to know which vehicle has the right of way. The car that is furthest to the right is allowed to go first. Though this is the appropriate and legal method, there are still motorist who don't always follow this rule. To avoid accidents, you may choose to wait a few seconds before moving forward. After all, just because it's technically you're turn to go, doesn't necessarily mean the other vehicles will allow you to do so.

The present system provides a new method to allow a vehicle to determine the right of way order at all-way stop intersection, specially since the vehicle unit V10 comprises a long range transceiver module. Therefore, as soon as a vehicle approaches an intersection assigned the all-way stop Case and is less than 200 meters (for example) away from this intersection as a threshold distance, it is periodically transmitting a same radio signal, this signal is carrying the intersection ID, the segment orientation of the segment it moves on, the heading of the vehicle, a time stamp and a code O (to represent the order of arriving at this intersection). Each vehicle approaching this intersection compares the time stamps of all vehicles including itself to determine the right of way order. The vehicle with the earliest arriving time displays blinking green traffic signal on its own LCD screen 40 to indicate the right of way while other vehicles display a stop sign image on their LCD screens. If more than one vehicle arrived at the same time, the system gives the northbound heading priority before eastbound, and the eastbound priority before southbound, and the southbound priority before westbound for example. After the vehicle exits the intersection, it stops transmitting the radio signal.

In another embodiment of the all-way stop intersection, vehicles traveling on a same segment in a same heading can be grouped together, in this case the vehicle with the earliest arriving time along with other vehicles on its same segment and its same heading display blinking green signal on their LCD screens while other vehicles display a stop sign image on their LCD screens.

Similarly, the concept of grouping vehicles traveling on a same segment and a same heading can be used in managing traffic circles by the present system (traffic circle is a type of intersection that directs both turning and through traffic onto a one-way circular roadway). In this case, the vehicle with the earliest arriving time along with other vehicles on its same segment and its same heading display a blinking green traffic signal on their LCD screens while other vehicles display a stop sign image on their LCD screens.

In another embodiment, as soon as a vehicle is less than 200 meters away from approaching an intersection assigned the Circle Case (or the all-way stop Case), it is periodically transmitting a same radio signal, this signal is carrying the intersection ID, the segment orientation of the segment it moves on, the heading of the vehicle, a time stamp and a code O (to represent the order of arriving at this intersection). Each vehicle approaching this intersection compares the time stamps and the number of vehicles in each segment, thus, the segment with the highest number of vehicles will get the right of way and display blinking green traffic signal on their LCD screens while other vehicles display a stop sign image on their LCD screens. Or if the number of vehicles in the segment of the highest number of vehicles is less than two or three vehicles (the minimum number of vehicles for example), then, the segment in which one vehicle has the earliest arrival time will get the right of way. Or if a vehicle has the earliest arrival time and exceeded the maximum waiting time (a few minutes for example) at the circle regardless the number of vehicles in each segment, then, it will get the right of way along with all vehicles in its own segment.

It is very obvious in the traffic circle case that vehicles with the right of way may not need to move in one way direction to exit the circle since all vehicles in all segments will access the circle one segment at a time.

It is very obvious too that making the vehicles to determine the right of way order at all-way stop intersections and at traffic circles will eliminate the discomfort and confusion most drivers feel, also it will reduce the waiting time.

It is very obvious too that the vehicle may not need to slow down or to fully stop when it arrives before other vehicles or when no other vehicles approaching the all-way stop intersection or the traffic circle.

It is very obvious too that autonomous vehicles may integrate the above all-way stop method for traffic circles and all-way stop intersections, wherein the vehicle can determine the right of way order automatically.

It is very obvious too that autonomous vehicles may integrate the above method for triggering green traffic signal and turning traffic signal on a heavy traffic road.

It is very obvious too that in other embodiments of indicating the in-vehicle traffic light signals and the in-vehicle road sings of the present invention, this indication could be via in-vehicle audible messages directed to the vehicle driver for cases such as motorcycles to enhance the safety of the driver while keeping his eyes on the road. Also, in other embodiments of indicating: the in-vehicle traffic signals, the in-vehicle road sings and the in-vehicle virtual preemption for both ordinary and emergency vehicles, this indication will be via in-vehicle computer codes directed to the vehicle computer system for cases such as autonomous vehicles.

The foregoing details of the present invention clearly show that autonomous vehicles can benefit from the present autonomous in-vehicle traffic light system; the autonomous road sign images "Researchers at the University of Washington found that by using stickers made with just a home printer, they could confuse the computer vision systems of driverless cars, causing them to incorrectly read road signs"; Also, driverless vehicles can benefit from the virtual preemption system for both emergency vehicles and ordinary vehicles wherein this system is extremely efficient and accurate compared to other systems, for instance "Waymo company was able to compile a library of sights and sounds from its autonomous test vehicle to be able to recognize what ambulances and other emergency vehicles look and sound like in real life situations, Waymo is already using the data it collected to teach its self-driving system how to detect where sirens are coming from. By being able to point out the direction where emergency vehicles are located, its autonomous cars can move to the side if they're passing from behind or yield at an intersection to let them pass first". Additionally, driverless vehicles can benefit from triggering green traffic lights and the turning traffic lights at heavy traffic roads and the right of way order at all-way stop intersections and at traffic circles, of the present invention. These benefits can allow autonomous vehicles to overcome many problems they faced during their field test.

Certain additional advantages and features of this invention may be apparent to those skilled in the art upon studying the disclosure, or may be experienced by persons employing the novel system and method of the present invention.

Other advantages of the present invention include enhancing traffic safety, reduce cost, reduce accidents rates, death rates, injuries rates and damage rates at intersections.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

The invention claimed is:

1. An autonomous in-vehicle virtual traffic light system comprising:
   a) an in-vehicle apparatus further comprising:
      i) at least one memory comprising computer program code for one or more programs;
      ii) a database comprising:
         (i) position coordinates of track points along the center line of roads and at center points of intersections for determining geographic sections and leg segments of intersections, wherein the position coordinates of track points are arranged in database tables and one or more table represent one or more geographic section;
         (ii) predefined leg segments associated with predefined intersections;
         (iii) a plurality of predefined cases and threshold delay times;
         (iv) green and turning times associated with the predefined cases;
         (v) red and turning times associated with the predefined cases; and,
         (vi) position coordinates of track points along the center line of roads for determining road sign image IDs, and road sign images associated with the road sign image IDs, wherein the position coordinates of the track points are arranged in database tables and one or more table represent one or more geographic section;
      iii) at least one GPS receiver module to enable the vehicle to determine its position coordinates, speed, course and date/time at real-time status; and,
      iv) at least one processor being coupled to said database and said memory;
   b) a visual display coupled to said in-vehicle apparatus, and able to present visual and audible information, wherein the visual information comprises traffic signal phases and images of road signs, wherein the audible information comprises, indicating traffic signal phases, indicating road sign images, and indicating alerts;
wherein the system mimics conventional traffic signal systems and neither depends on vehicle to vehicle communication nor vehicle to intersection or road sensors communication nor vehicle to wireless network communication.

2. The system of claim 1, wherein the database and the computer program code are configured to, with the at least one processor, cause the in-vehicle apparatus to:
 a) determine a geographic section in which the vehicle's position coordinates are located;
 b) determine a leg segment ID associated with a leg segment on which the vehicle is traveling by applying triangulation for the vehicle's position coordinates and the coordinates of two track points the vehicle is traveling between them, wherein a perpendicular distance from the vehicle's position to the line between the two track points doesn't exceed half of a selected segment's width;
 c) extract two intersection IDs and an orientation code associated with the leg segment ID;
 d) determine a case ID associated with at least one time period for at least one of the two intersection IDs; threshold delay time associated with the case ID; and the position coordinates associated with the intersection ID, based on the vehicle's heading, wherein the vehicle's heading is determined based on the orientation code of the leg segment and the GPS receiver module's course;
 e) determine green and turning times associated with the case ID; and,
 f) display traffic signal phases based on the green and turning times, and threshold delay time.

3. The system of claim 2, wherein the plurality of predefined cases run on a plurality of predefined case models, wherein a case model comprises:
 a) a block of a programming code as a component of the memory's computer program code configured to mathematically coordinate all stages of intersection leg segments, wherein a stage is a group of traffic signal phases assigned to a single leg segment, wherein all stages do not conflict with each other when the stages run at the same time;
 b) virtually running an entire intersection in all directions with a manner similar to a conventional traffic controller, wherein the case model is configured to represent traffic volume size in each leg segment of an intersection.

4. The system of claim 2, wherein the leg segment is a section of a road between two consecutive intersections; an intersection leg segment of a selected length, wherein the leg segment orientation is a selected code to define a leg of an intersection as a vertical segment for either northbound or southbound heading of the traveling vehicle or a horizontal segment for either eastbound or westbound heading of the traveling vehicle.

5. The system of claim 2, wherein the database and the computer program code are configured to, with the at least one processor, further cause the in-vehicle apparatus to:
 a) activate a section of a case model's programming code associated with, a case ID, threshold delay time, and the green and turning times associated with the case ID, based on the leg segment orientation and the vehicle's heading; and,
 b) prompt the visual display to display traffic signal phases associated with said section of case model's programming code, a remaining time of a current signal phase, a distance between the traveling vehicle and an upcoming intersection, the vehicle's course, and the vehicle's speed.

6. The system of claim 2, wherein the vehicle's heading further comprises:
 a) an eastbound including the GPS receiver module's course ranging from 1 to 179 degrees;
 b) a westbound including the GPS receiver module's course ranging from 181 to 359 degrees;
 c) a southbound including the GPS receiver module's course ranging from 91 to 269 degrees; and,
 d) a northbound including the GPS receiver module's course ranging from 0 to 89 degrees and the GPS receiver module's course ranging from 271 to 360 degrees.

7. The system of claim 2, wherein the database and the computer program code are configured to, with the at least one processor, further cause the in-vehicle apparatus to calculate the distance between the traveling vehicle and an upcoming intersection for one or more functions comprising a visual and an audible alert during red or yellow signal phase when the vehicle is proximate to the intersection, to enhance the driver's awareness.

8. The system of claim 7, wherein the visual alert is distinctively displayed as a red geometric shape, a red traffic signal image icon, a yellow geometric shape or a yellow traffic signal image icon.

9. The system of claim 2, wherein the traffic signal phases are selected from a group consisting of a green, a yellow, a red, a green left arrow, a yellow left arrow, a green right arrow and a yellow right arrow as geometric shapes or image icons displayed differently than the visual alert signal phases.

10. The system of claim 2, wherein the threshold delay times are arranged to create coordinated control to allow progression so that the stage changes occur in some relationship to other nearby intersections.

11. The system of claim 2, wherein at least one case ID is assigned to a single intersection for at least one time period, the time period comprising high, medium, or low traffic volume.

12. The system of claim 2, wherein the database and the computer program code are configured to, with the at least one processor further cause the in-vehicle apparatus to arrange timers, distance counters and deviation angles to verify the leg segment on which the vehicle is traveling to eliminate any chance of segments' interference, wherein the more time and distance inside a segment and the less is the deviation angle the more likely to override other segments.

13. The system of claim 2, wherein a distinctive road sign mounted at the intersection or distinctive colored marks are painted on the intersection's pavement indicating an intersection is assigned at least one predefined case to enhance the driver's awareness when approaching the intersection.

14. The system of claim 1, wherein the visual display further comprising a strip of LEDs to indicate the traffic signal phases to the driver.

15. The system of claim 1, for displaying road sign images, wherein the database and the computer program code are configured to, with the at least one processor, further cause the in-vehicle apparatus to:
 a) determine a geographic section in which the vehicle's position is located;
 b) determine road sign image IDs between two track points on a road segment on which the vehicle is traveling by applying triangulation for the vehicle's position coordinates and the coordinates of two track points, wherein a perpendicular distance from the vehicle's position to the line between the two track points doesn't exceed half of a selected segment's width;
 c) display road sign images based on, the road sign image IDs, a road segment orientation associated with the road segment and the heading of the vehicle, wherein the road segment orientation is a selected code; and, d) display a road sign image indicating wrong way heading, in addition to audible alert when a vehicle heading opposite of traffic on one-way road.

16. The system of claim 15, wherein the database and the computer program code are configured to, with the at least one processor further cause the in-vehicle apparatus to arrange timers, distance counters and deviation angles to verify the road segment on which the vehicle is traveling to eliminate any chance of segments' interference, wherein the more time and distance inside a segment and the less is the deviation angle the more likely to override other segments.

17. The system of claim 15, wherein the road sign images are a collection of the actual road signs images arranged in the database to be displayed in designated headings, designated time, designated days, and designated seasons.

18. A method for building the database for the system of claim 1, the method comprising processing software being coupled to a processing digital map capable of generating latitude and longitude coordinates for marked points on roads of the map, to execute the following steps:

i) converting traffic volume data of roads to size codes and assigning the size codes to relevant roads, wherein a single road has at least one size code depending on the changes of the traffic volume in this road during the day;

ii) calculating green and turning times for a plurality of predefined cases, wherein the green and turning times are saved as preset values in the predefined case;

iii) configuring a plurality of predefined case models associated with said predefined cases to display traffic signal phases, wherein a case model is a computer program code configured based on the size difference in traffic volumes in all leg segments of an intersection;

iv) marking center points of intersections, center-line track points between the intersections and center-line track points of roads, and generating the position coordinates associated with said center points and said track points;

v) assigning one or more predefined case to each intersection based on the size code levels of all leg segments of the intersection;

vi) calculating threshold delay times at intersections based on the predefined cases at said intersections and the distance between them;

vii) identifying each road by a unique code inside a geographic section and coding intersections on the road, wherein a unique code is associated with each road of a single intersection;

viii) assigning an orientation code to each road of the intersection to define the road as vertical or horizontal;

ix) generating a leg segment identification for a segment between two intersections based on the orientation code of the segment and the codes of the two intersections; and, x) identifying each road sign image by a unique code and assigning one or more code to each road segment based on the size codes of the road segment and the purpose of the signs for designated headings, designated time, designated days, and designated seasons.

19. A method of actuating traffic signals designed to keep heavy traffic traveling with green lights until they detect a vehicle arrives at a cross street of an intersection and change accordingly, comprising the autonomous in-vehicle virtual traffic light system coupled to or integrated with an in-vehicle communication means to wirelessly communicating with vehicles, the method further comprising the steps of:

a) assigning a predefined case to the intersection representing continuous green signal phase in the heavy traffic road;

b) where vehicles on heavy traffic road proximate to the intersection receive traffic data comprising a time stamp at which a vehicle on another road transmitting, a right of way request code, the time stamp, the intersection ID, a segment orientation of the other road and the heading of said vehicle; and, wherein said vehicles switch to a temporary traffic light cycle containing few seconds of yellow before a red signal, and periodically transmitting the same received traffic data to other vehicles proximate to the intersection to allow them to calculate the remaining time of the temporary traffic light cycle.

20. The method of claim 19, further comprising the steps of:

a) where vehicles on the heavy traffic road proximate to the intersection receive traffic data comprising a time stamp at which a vehicle on the heavy traffic road transmitting: a turning request code, the time stamp, the intersection ID, a segment orientation of the heavy traffic road and the heading of said vehicle; and, wherein the vehicles on the opposite heading of said vehicle's heading switch to a temporary traffic light cycle containing few seconds of yellow before a red signal, and periodically transmitting the same received traffic data to other vehicles proximate to the intersection to allow them to calculate the remaining time of the temporary traffic cycle.

21. The method of claim 19, wherein the in-vehicle communication means comprising a long range transceiver module.

22. A method for determining a right of way order at all-way stop intersection or at a traffic circle, comprising the autonomous in-vehicle virtual traffic light system coupled to or integrated with an in-vehicle communication means to wirelessly communicating with vehicles, the method further comprising the steps of:

a) assigning a predefined case to the intersection representing all-way stop intersection or a traffic circle;

b) where vehicles approaching the intersection or the circle are receiving traffic data comprising a time stamp at which a vehicle reached a threshold distance when approaching the intersection or the circle, wherein said vehicle is periodically transmitting same traffic data comprising, the time stamp, an order of arriving code, the intersection ID, a segment orientation of said vehicle and said vehicle's heading;

c) wherein each vehicle is comparing all time stamps to determine a right of way order based on the earliest arriving time to visually and audibly indicating a right of way;

d) wherein when the earliest arriving time is matching more than one vehicle, determining a right of way order is decided based on a preset heading order;

e) wherein vehicles on a same segment in a same heading can be grouped together to obtain a group right of way order based on an earliest arriving time for just one vehicle in the segment if the number of vehicles in the segment exceeded a selected minimum amount or when the vehicle of the earliest arriving time exceeded a selected maximum waiting time, to visually and audibly indicating a right of way;

f) wherein vehicles traveling on a same segment in a same heading can be grouped together to further obtain a group right of way order based on a highest number of vehicles in a segment if the highest number exceeded a selected minimum amount to visually and audibly indicating a right of way; and, g) wherein vehicles with a right of way are not required to travel in one way direction to exit the circle since all vehicles in all segments access the traffic circle one segment at a time wherein a right of way order is established at an all way stop intersection or a traffic circle.

23. The method of claim 22, wherein the in-vehicle communication means comprising a long range transceiver module.

24. A method for providing traffic data autonomously to an autonomous vehicle comprising:

a) processing traffic data extracted from the autonomous in-vehicle virtual traffic light system, wherein said traffic data comprising: position coordinates of track points along the center line of roads and at center points of intersections for determining predefined leg segments associated with predefined intersections; a plurality of predefined cases associated with predefined intersections for processing the in-vehicle virtual traffic signal phases autonomously, traffic data indicating the status of the in-vehicle virtual traffic signal phases; and, traffic data associated with road signs;

b) receiving/transmitting traffic data for actuating traffic signals designed to keep heavy traffic traveling with green lights until they detect a vehicle arriving at a cross street of an intersection and change accordingly, wherein, the traffic data comprising: a time stamp at which the vehicle is transmitting, a right of way request code, the intersection ID, a segment orientation of the road on which the vehicle is traveling, the heading of the vehicle, and traffic data indicating the right of way; and, c) receiving/transmitting traffic data when approaching all-way stop intersection or a traffic circle for determining a right of way order, wherein the traffic data comprising, a time stamp at which a vehicle reached a threshold distance when approaching the intersection or the circle, an order of arriving code, the intersection ID, a segment orientation of the road on which the vehicle is traveling, the heading of the vehicle, and traffic data indicating the right of way.

* * * * *